(12) United States Patent
Matsuoka et al.

(10) Patent No.: US 12,489,854 B2
(45) Date of Patent: Dec. 2, 2025

(54) INFORMATION PROCESSING APPARATUS, NON-TRANSITORY COMPUTER READABLE MEDIUM, AND INFORMATION PROCESSING METHOD FOR PROPOSING OPTIMAL CONTENT TRANSMISSION METHODS TO USERS

(71) Applicant: FUJIFILM BUSINESS INNOVATION CORP., Tokyo (JP)

(72) Inventors: Daiki Matsuoka, Yokohama (JP); Itsusei Matsushita, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 488 days.

(21) Appl. No.: 17/890,840

(22) Filed: Aug. 18, 2022

(65) Prior Publication Data

US 2023/0283723 A1 Sep. 7, 2023

(30) Foreign Application Priority Data

Mar. 4, 2022 (JP) ................................. 2022-033454

(51) Int. Cl.
*H04N 1/00* (2006.01)

(52) U.S. Cl.
CPC ..... *H04N 1/00421* (2013.01); *H04N 1/00411* (2013.01); *H04N 1/00437* (2013.01); *H04N 2201/33364* (2013.01)

(58) Field of Classification Search
CPC .......... H04N 1/00421; H04N 1/00411; H04N 1/00437; H04N 2201/33364
USPC ...................................................... 358/1.15
See application file for complete search history.

(56) References Cited

U.S. PATENT DOCUMENTS

| | | | |
|---|---|---|---|
| 6,674,537 B2 * | 1/2004 | Kadowaki | H04N 1/00395 358/1.15 |
| 9,916,308 B2 | 3/2018 | Tsujimoto | |
| 2008/0055659 A1 * | 3/2008 | Uchida | H04N 1/32048 358/400 |
| 2009/0091788 A1 | 4/2009 | Yoshida et al. | |
| 2010/0149591 A1 * | 6/2010 | Hase | H04N 1/4413 358/1.15 |
| 2014/0304324 A1 | 10/2014 | Hirata | |
| 2020/0322500 A1 * | 10/2020 | Mogaki | H04N 1/00209 |

FOREIGN PATENT DOCUMENTS

| | | |
|---|---|---|
| EP | 3 508 988 A1 | 7/2019 |
| JP | 2000-293458 A | 10/2000 |
| JP | 2014-203300 A | 10/2014 |
| JP | 2014-211732 A | 11/2014 |
| JP | 2014-241113 A | 12/2014 |

OTHER PUBLICATIONS

Jul. 3, 2023 Search Report issued in European Patent Application No. 22199961.8.
Jun. 19, 2024 Office Action issued in European Patent Application No. 22199961.8.

* cited by examiner

*Primary Examiner* — Allen H Nguyen
(74) *Attorney, Agent, or Firm* — Oliff PLC

(57) ABSTRACT

An information processing apparatus includes a processor configured to propose, in response to receipt of designation of a user as a destination of content data at a time of transmitting the content data, at least one transmission method to be used to transmit the content data to the user among plural transmission methods.

13 Claims, 33 Drawing Sheets

|  | APPLICATION A | APPLICATION B | APPLICATION C | ... |
|---|---|---|---|---|
| USER A | 50 | 0 | 150 | ... |
| USER B | 35 | 30 | 28 | ... |
| USER C | 100 | 10 | 48 | ... |
| USER D | 10 | 50 | 80 | ... |
| USER E | 0 | 80 | 20 | ... |

|  | STORAGE A | STORAGE B | STORAGE C | ... |
|---|---|---|---|---|
| USER A | 40 | 28 | 80 | ... |
| USER B | 50 | 56 | 10 | ... |
| USER C | 100 | 20 | 0 | ... |
| USER D | 85 | 150 | 15 | ... |
| USER E | 33 | 10 | 80 | ... |

INFORMATION PROCESSING APPARATUS, NON-TRANSITORY COMPUTER READABLE MEDIUM, AND INFORMATION PROCESSING METHOD FOR PROPOSING OPTIMAL CONTENT TRANSMISSION METHODS TO USERS

CROSS-REFERENCE TO RELATED APPLICATIONS

This application is based on and claims priority under 35 USC 119 from Japanese Patent Application No. 2022-033454 filed Mar. 4, 2022.

BACKGROUND

(i) Technical Field

The present disclosure relates to an information processing apparatus, a non-transitory computer readable medium, and an information processing method.

(ii) Related Art

Japanese Unexamined Patent Application Publication No. 2014-203300 discloses a content management apparatus including a display request accepting unit that accepts a display request for content; a first transmitting unit that transmits, to a post management service, a post acquisition request including source user information of the display request and a post identifier of contents posted for the content related to the display request to the post management service; a first receiving unit that receives match information from the post management service in response to a determination that the source user is designated as a posted contents sharing user who shares the posted contents identified by the post identifier in the post management service; and a display control unit that permits, in response to receipt of the match information, display of the content related to the display request.

Japanese Unexamined Patent Application Publication No. 2014-211732 discloses an information processing system including a document management server and a post management server. The document management server includes an accepting unit that accepts a request for sharing a document from a user, a registering unit that registers the document requested to be shared as a target to be shared between users, a determining unit that determines whether registration of the document by the registering unit has succeeded, and a posting unit that posts the document to the post management server in response to a determination that registration of the document by the registering unit has failed.

Japanese Unexamined Patent Application Publication No. 2014-241113 discloses a content management apparatus including a deletion request transmitting unit that transmits, to a post management service, a deletion request for deleting posted information that is related to content and that has been posted to the post management service; a response information receiving unit that receives, from the post management service, response information indicating that the posted information has been successfully deleted in response to the deletion request; and a content deleting unit that deletes content stored in a storage unit in response to receipt of the response information by the response information receiving unit.

SUMMARY

When content data, such as document data or image data, is to be transmitted, it may be difficult to decide which of plural transmission methods (email and applications) is to be used. For example, a transmission method that is frequently used varies according to a destination user, and thus it is difficult to decide which transmission method is appropriate.

Aspects of non-limiting embodiments of the present disclosure relate to an information processing apparatus, a non-transitory computer readable medium, and an information processing method that enable a source user to more easily select a transmission method for transmitting content data to a specific destination from among plural transmission methods, than in a case where there are no guidelines for selecting a transmission method.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to propose, in response to receipt of designation of a user as a destination of content data at a time of transmitting the content data, at least one transmission method to be used to transmit the content data to the user among plural transmission methods.

BRIEF DESCRIPTION OF THE DRAWINGS

An exemplary embodiment of the present disclosure will be described in detail based on the following figures, wherein.

DETAILED DESCRIPTION

Figure 1:
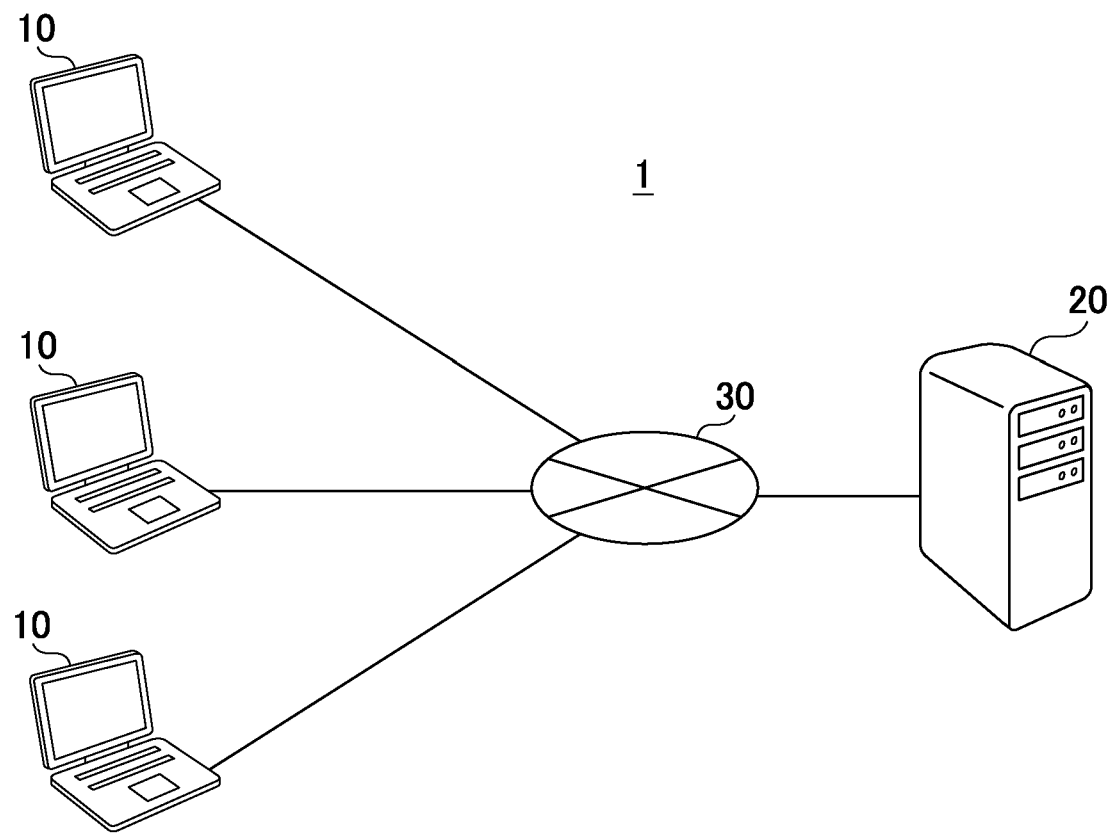
FIG. 1 is a diagram illustrating a schematic configuration of an information processing system including an information processing apparatus according to an exemplary embodiment.

Hereinafter, an exemplary embodiment of the present disclosure will be described with reference to the drawings. In the drawings, components or parts that are the same as or equivalent to each other are denoted by the same reference numerals. The dimensional ratios in the drawings are exaggerated for the convenience of illustration and may be different from the actual ratios.

FIG. 1 is a diagram illustrating a schematic configuration of an information processing system 1 including an information processing apparatus according to the present exemplary embodiment.

The information processing system 1 illustrated in FIG. 1 includes plural information processing apparatuses 10 and a server 20. The information processing apparatuses 10 are each connected to the server 20 via a network 30, such as the Internet or an intranet.

The information processing apparatuses 10 are each an apparatus used by a user and is, for example, a desktop or notebook personal computer. The information processing apparatus 10 according to the present exemplary embodiment is capable of selecting one or more transmission methods from among plural transmission methods to transmit content data to another user.

The information processing apparatus 10 according to the present exemplary embodiment is characterized in proposing a transmission method suitable for a destination user at the time of transmitting content data to the destination user. The information processing apparatus 10 according to the present exemplary embodiment enables a source user to more easily select a transmission method for transmitting content data to a designated user from among plural transmission methods, than in a case where there are no guidelines for selecting a transmission method.

The server 20 is an apparatus that stores various information in the information processing system 1. The server 20 according to the present exemplary embodiment stores information for managing users who use the information processing system 1, and information regarding the numbers of times of use of transmission methods used by the users who use the information processing system 1.

At the time of transmitting content data to a destination user, the information processing apparatus 10 proposes a transmission method suitable for the destination user by referring to information managed by the information processing apparatus 10 or information managed by the server 20.

Hereinafter, a description will be given of an example of the case of transmitting document data, which is an example of content data. The content data is not limited to document data and may be image data, audio data, or other digital data.

Figure 2:
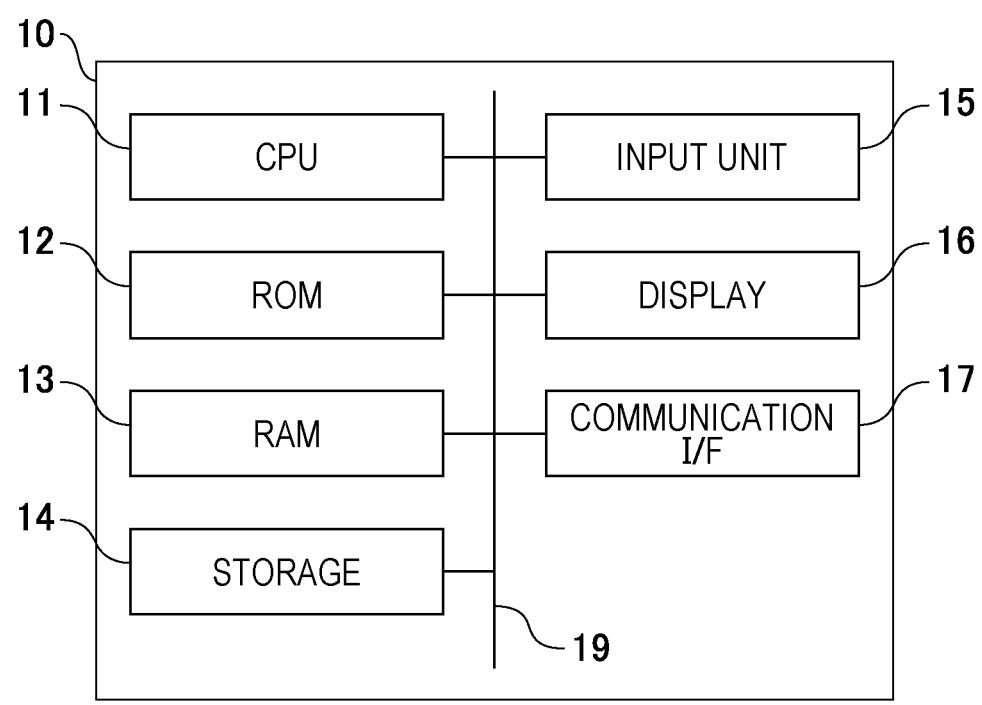
FIG. 2 is a block diagram illustrating a hardware configuration of the information processing apparatus.

FIG. 2 is a block diagram illustrating a hardware configuration of the information processing apparatus 10.

As illustrated in FIG. 2, the information processing apparatus 10 includes a central processing unit (CPU) 11, a read only memory (ROM) 12, a random access memory (RAM) 13, a storage 14, an input unit 15, a display 16, and a communication interface (I/F) 17. These components are connected to each other via a bus 19 so as to be capable of communicating with each other.

The CPU 11 executes various programs and controls the individual units of the information processing apparatus 10. Specifically, the CPU 11 reads out a program from the ROM 12 or the storage 14 and executes the program by using the RAM 13 as a work area. The CPU 11 controls the foregoing components and performs various arithmetic processing operations in accordance with a program stored in the ROM 12 or the storage 14. In the present exemplary embodiment, the ROM 12 or the storage 14 stores an information processing program of proposing a transmission method suitable for a user as a destination of content data.

The ROM 12 stores various programs and various data. The RAM 13 serves as a work area and temporarily stores a program or data. The storage 14 is constituted by a storage device such as a hard disk drive (HDD), a solid state drive (SSD), or a flash memory, and stores various programs including an operating system and various data.

The input unit 15 includes a pointing device such as a mouse, and a keyboard, and is used to perform various input operations.

The display 16 is, for example, a liquid crystal display, and displays various information. The display 16 may employ a touch screen scheme and may function as the input unit 15.

The communication interface 17 is an interface for communicating with another apparatus, such as another information processing apparatus 10 or the server 20, and uses, for example, the standard of Ethernet (registered trademark), FDDI, Wi-Fi (registered trademark), or the like.

At the time of executing the foregoing information processing program, the information processing apparatus 10 implements various functions by using the above-described hardware resources. The functional configuration implemented by the information processing apparatus 10 will be described.

Next, the functional configuration of the information processing apparatus 10 will be described.

Figure 3:
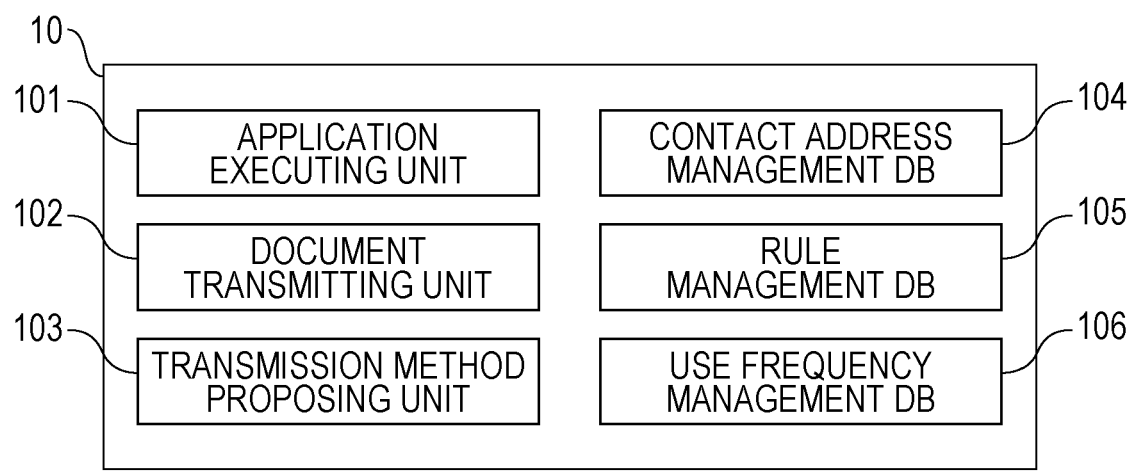
FIG. 3 is a block diagram illustrating an exemplary functional configuration of the information processing apparatus.

FIG. 3 is a block diagram illustrating an exemplary functional configuration of the information processing apparatus 10.

As illustrated in FIG. 3, the information processing apparatus 10 includes, as a functional configuration, an application executing unit 101, a document transmitting unit 102, and a transmission method proposing unit 103. The functional configuration is implemented by the CPU 11 reading out and executing the information processing program stored in the ROM 12 or the storage 14. In addition, as illustrated in FIG. 3, the information processing apparatus 10 includes, as a functional configuration, a contact address management database (DB) 104, a rule management database 105, and a use frequency management database 106.

Figure 4:
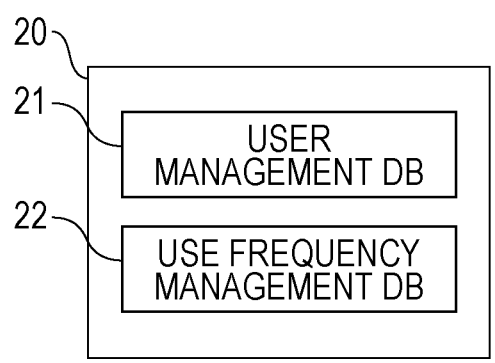
FIG. 4 is a block diagram illustrating an exemplary functional configuration of a server.

FIG. 4 is a block diagram illustrating an exemplary functional configuration of the server 20. The server 20 includes a user management database 21 and a use frequency management database 22.

The application executing unit 101 executes an application in the information processing apparatus 10. The application executed by the application executing unit 101 is not particularly limited as long as being installable into the information processing apparatus 10. In the present exemplary embodiment, the application executing unit 101 executes a document management application having a function of managing and editing document data.

The document transmitting unit 102 executes a process of transmitting document data managed by the document management application to another user. The document transmitting unit 102 uses at least one transmission method to transmit the document data. The transmission method is not limited to a specific method, such as email, a communication tool, a social networking service, or a cloud storage service. The document management application uses a mailer or uses a communication tool, a social networking service, a cloud storage service, or the like for which a login setting has been performed in advance, at the time of transmitting document data by using a transmission method.

The document transmitting unit 102 connects to the contact address management database 104 and the user management database 21 of the server 20 at the time of transmitting document data to another user. The document transmitting unit 102 connects to the rule management database 105 to set a transmission rule.

The transmission method proposing unit 103 proposes a transmission method suitable for a destination user among plural transmission methods at the time of transmitting document data managed by the document management application to the destination user. The transmission method proposing unit 103 proposes, for example, a transmission method that is used by the destination user most frequently. Specifically, the transmission method proposing unit 103 proposes, based on information regarding the numbers of times of use of the individual transmission methods by the destination user, at least one transmission method to be used to transmit the document data among the plural transmission methods. The information regarding the numbers of times of use is stored in the use frequency management database 106 and the use frequency management database 22 of the server 20. The transmission method proposing unit 103 refers to the information regarding the numbers of times of use stored in the use frequency management database 22 of the server 20. The transmission method proposing unit 103 may use, as the information regarding the numbers of times of use, information regarding the numbers of operations performed by the destination user for individual types of operations in the individual transmission methods. The information regarding the numbers of operations may include information regarding at least the numbers of times of startup, the numbers of times of transmission, or the numbers of times of reception. The numbers of times of startup, the numbers of times of transmission, and the numbers of times of reception may have predetermined weights applied thereto.

The transmission method proposing unit 103 may propose, based on information regarding the numbers of times of use of the individual transmission methods between the destination user and another user, at least one transmission method to be used to transmit the document data to the destination user among the plural transmission methods. In this case, the transmission method proposing unit 103 may propose, based on information regarding the numbers of times of use of the individual transmission methods at the time of transmitting document data from the destination user to the user of the information processing apparatus 10, at least one transmission method to be used to transmit the document data to the destination user among the plural transmission methods.

In a case where a transmission method usually used for a user has been registered and where the registered transmission method is different from a transmission method that is to be proposed for the user when the user is designated as a destination, the transmission method proposing unit 103 may propose the transmission method different from the registered transmission method.

The transmission method proposing unit 103 may propose, as the transmission method to be used to transmit the document data to the destination user, a transmission method designated by the destination user among the plural transmission methods. The transmission method proposing unit 103 may propose, based on information regarding an attribute of the destination user, at least one transmission method to be used to transmit the document data to the destination user among the plural transmission methods. The attribute of the user may be, for example, belonging, an official position, a place of employment, or the like. The transmission method proposing unit 103 may propose, in accordance with the contents of the document data, a transmission method to be used to transmit the document data to the destination user among the plural transmission methods. The contents of the document data may be, for example, the type of the document data, the title of the document data, the original creator of the document data, or the like.

The contact address management database 104 is a database for managing information of contact addresses registered by the user of the information processing apparatus 10.

The rule management database 105 is a database for managing a transmission rule for transmitting document data by the user of the information processing apparatus 10 to another user. The rule management database 105 manages a destination, a transmission message, a transmission method, and so forth, as a transmission rule.

The use frequency management database 106 stores information regarding the numbers of times of use of transmission methods used by the user of the information processing apparatus 10. The information stored in the use frequency management database 106 is regularly transmitted to the server 20 and is stored in the use frequency management database 22 of the server 20.

The user management database 21 is a database for managing users of the information processing system 1. The user management database 21 manages, for example, user IDs, names, belongings, official positions, and so forth, as information for managing the users.

The use frequency management database 22 acquires, from the individual information processing apparatuses 10, information regarding the numbers of times of use of transmission methods used by the users of the individual information processing apparatuses 10, and compiles and stores the information.

With the above-described configuration, the information processing apparatus 10 according to the present exemplary embodiment is capable of proposing a transmission method suitable for a destination user at the time of transmitting document data to the destination user. The user of the information processing apparatus 10 receives the proposal of the transmission method from the information processing apparatus 10, thereby being able to select a transmission method more easily than in a case where there are no guidelines for selecting a transmission method.

Next, a description will be given of examples of a user interface displayed on the display 16 as a result of the document management application being executed by the application executing unit 101 of the information processing apparatus 10 according to the present exemplary embodiment.

Figure 5:
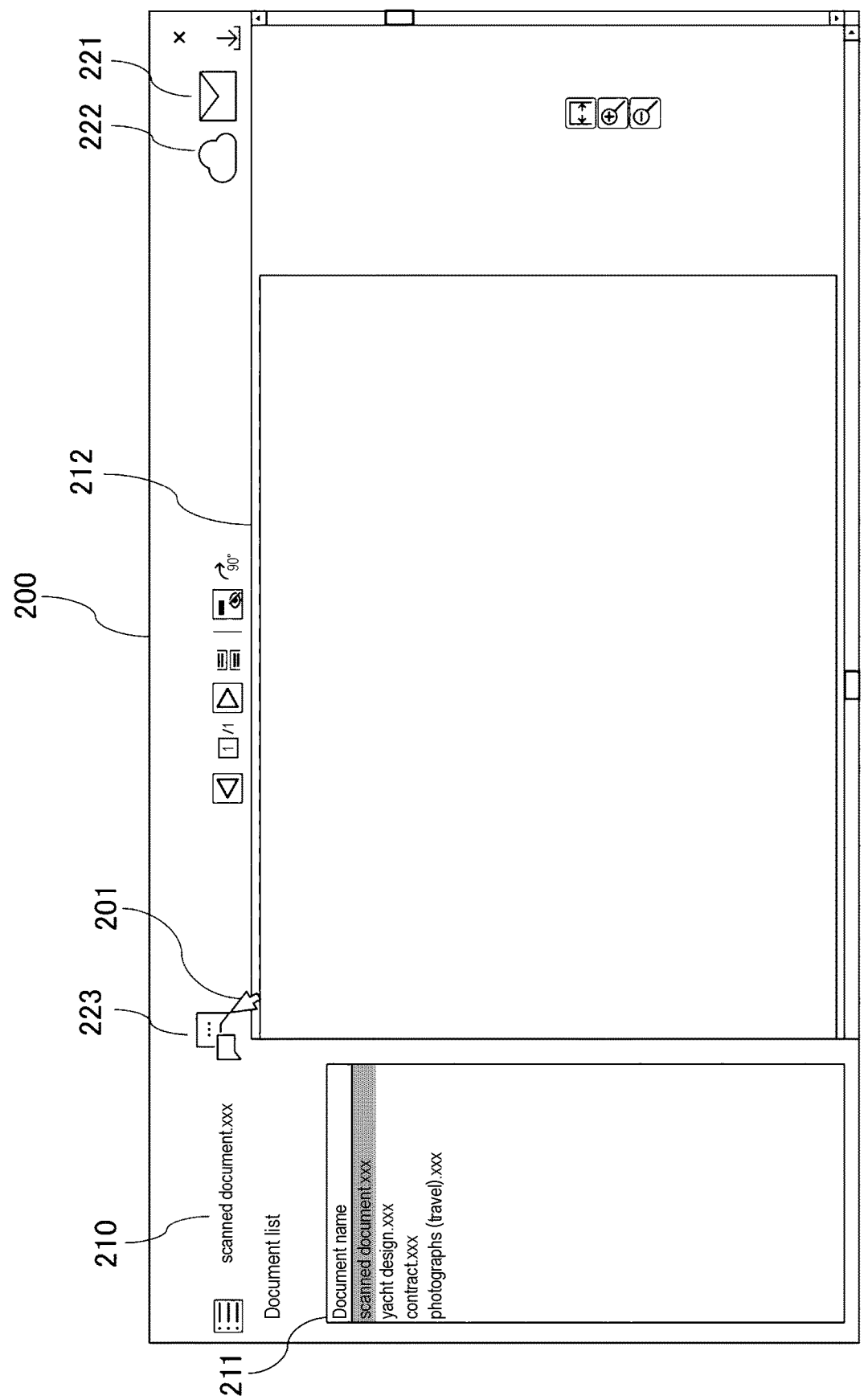
FIG. 5 is a diagram illustrating an example of a user interface displayed by the information processing apparatus.

FIG. 5 is a diagram illustrating an example of the user interface displayed by the information processing apparatus 10. FIG. 5 illustrates an example of a user interface 200 displayed by the document management application. The user interface 200 includes a file name 210 of document data, a document list 211, a document data display region 212, an icon 221 for transmitting document data by email, an icon 222 for uploading document data to a cloud service, and an icon 223 for transmitting document data by using a message function of a communication tool or an SNS.

The icons 221, 222, and 223 can each be moved to any position on the user interface 200 by a user operation. FIG. 5 illustrates an example of a state in which the user is operating a mouse cursor 201 to move the icon 223 on the user interface 200.

Figure 6:
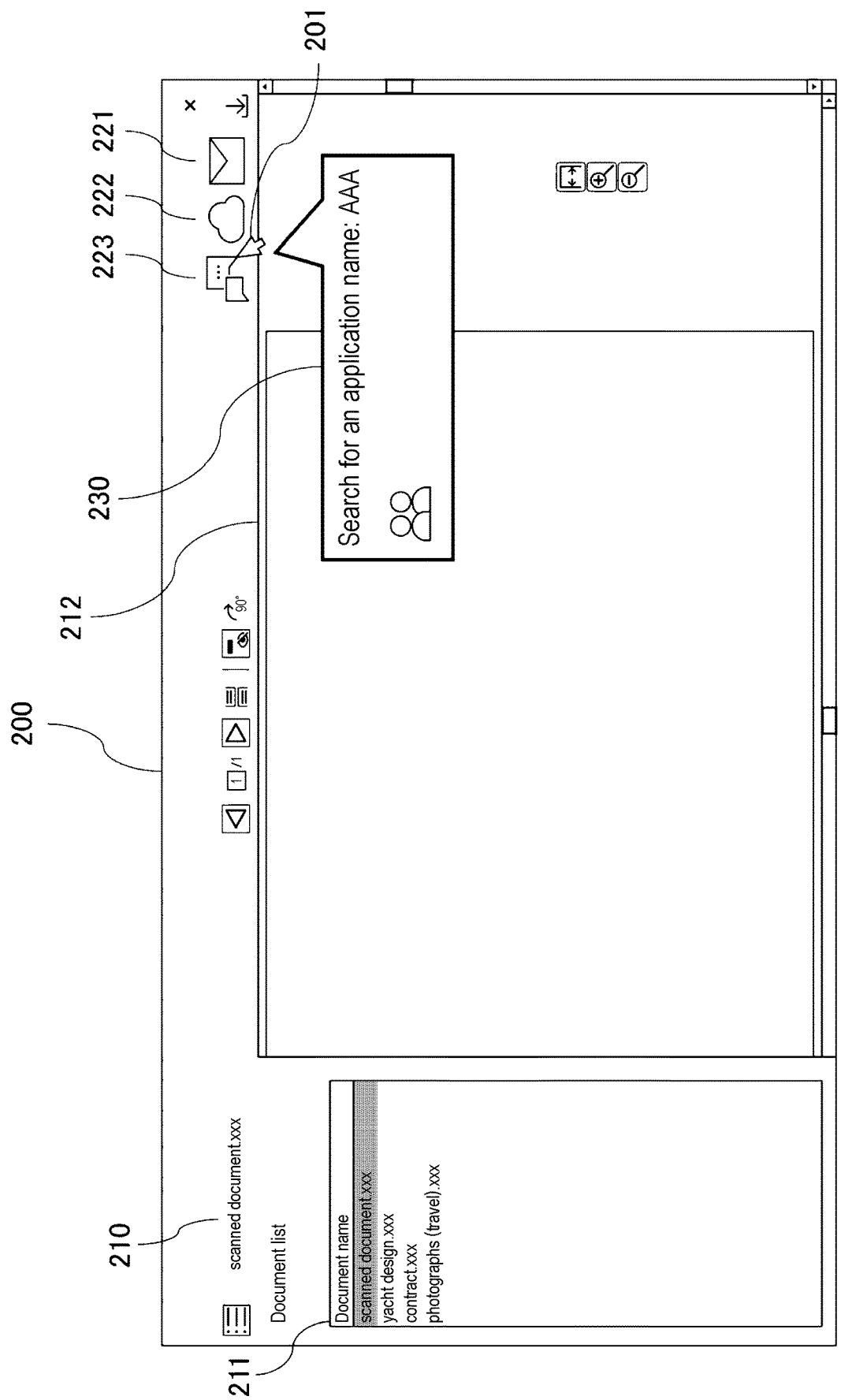
FIG. 6 is a diagram illustrating an example of the user interface displayed by the information processing apparatus.

In response to the icon 223 being selected by the user, the document management application displays, on the user interface 200, a screen for selecting a communication tool or SNS application of using a message function. FIG. 6 is a diagram illustrating an example of the user interface displayed by the information processing apparatus 10. FIG. 6 illustrates an example of a screen 230 that is displayed in response to the icon 223 being selected by the user. In FIG. 6, a screen for searching for a communication tool or SNS application of using a message function is displayed on the screen 230.

Figure 7:
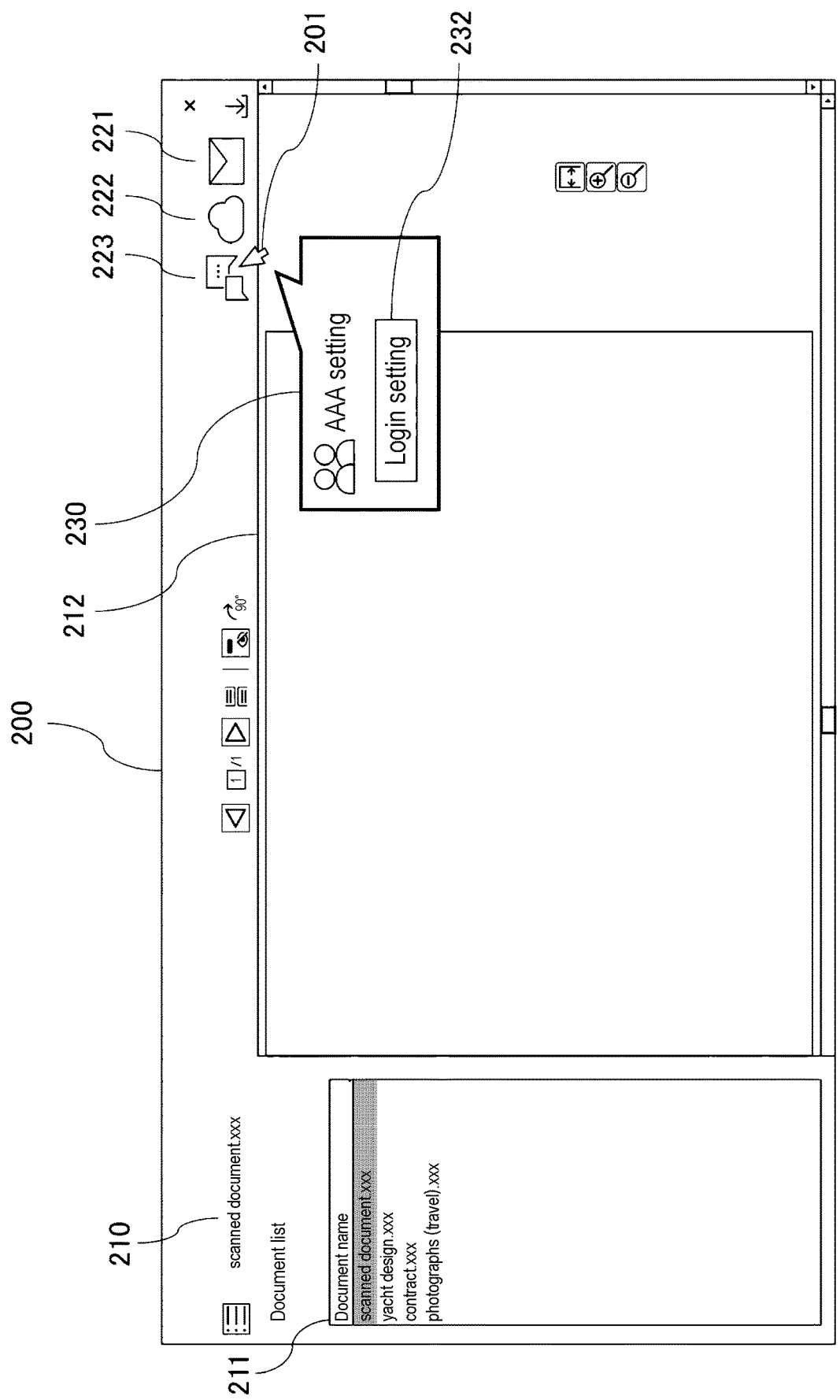
FIG. 7 is a diagram illustrating an example of the user interface displayed by the information processing apparatus.

In response to an application being selected, the document management application displays, on the user interface 200, a screen for allowing the user to perform login setting of the selected application. FIG. 7 is a diagram illustrating an example of the user interface displayed by the information processing apparatus 10. FIG. 7 illustrates an example in which a login setting button 232 of the application selected by the user is displayed on the screen 230. In response to the login setting button 232 being selected by the user, the information processing apparatus 10 displays a login setting screen of the application selected by the user.

Figure 8:
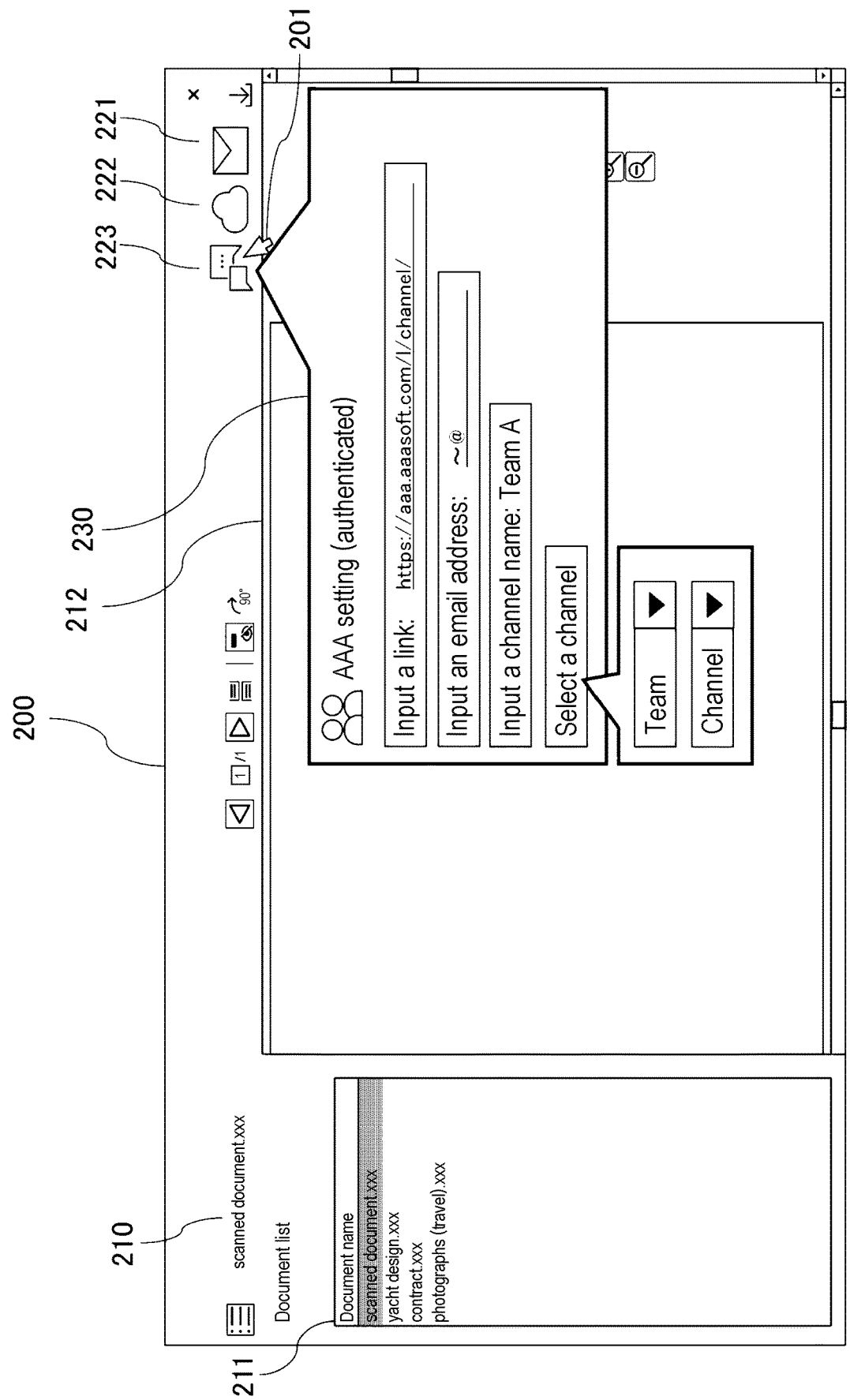
FIG. 8 is a diagram illustrating an example of the user interface displayed by the information processing apparatus.
Figure 9:
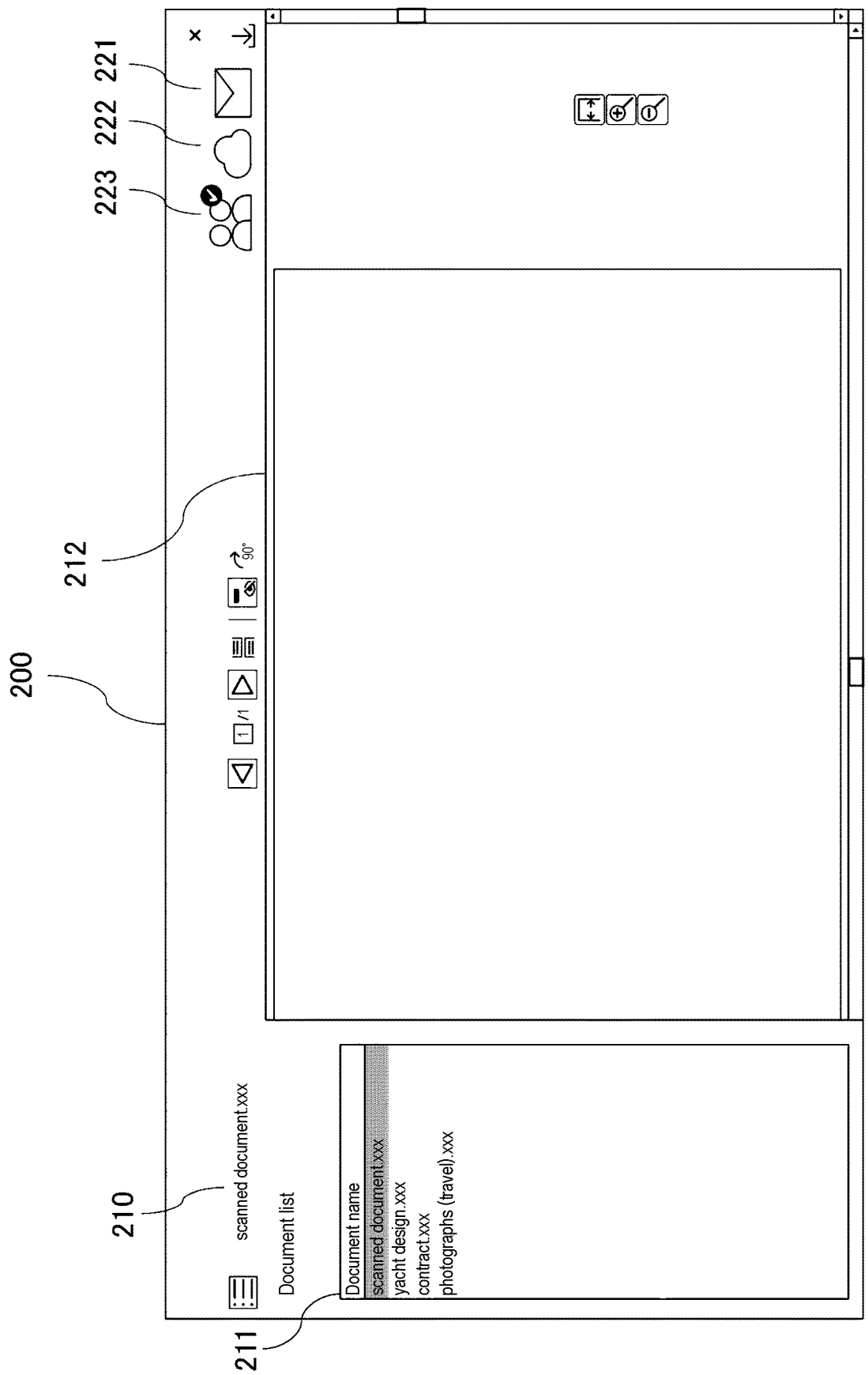
FIG. 9 is a diagram illustrating an example of the user interface displayed by the information processing apparatus.

FIG. 8 is a diagram illustrating an example of the user interface displayed by the information processing apparatus 10. FIG. 8 illustrates an example in which a login setting screen of the application selected by the user is displayed on the screen 230. In response to login setting being completed, the information processing apparatus 10 displays, as the icon 223, an icon corresponding to the application selected by the user. FIG. 9 is a diagram illustrating an example of the user interface displayed by the information processing apparatus 10. FIG. 9 illustrates an example in which an icon corresponding to the application which has been selected by the user and for which login setting has been completed is displayed as the icon 223.

Figure 10:
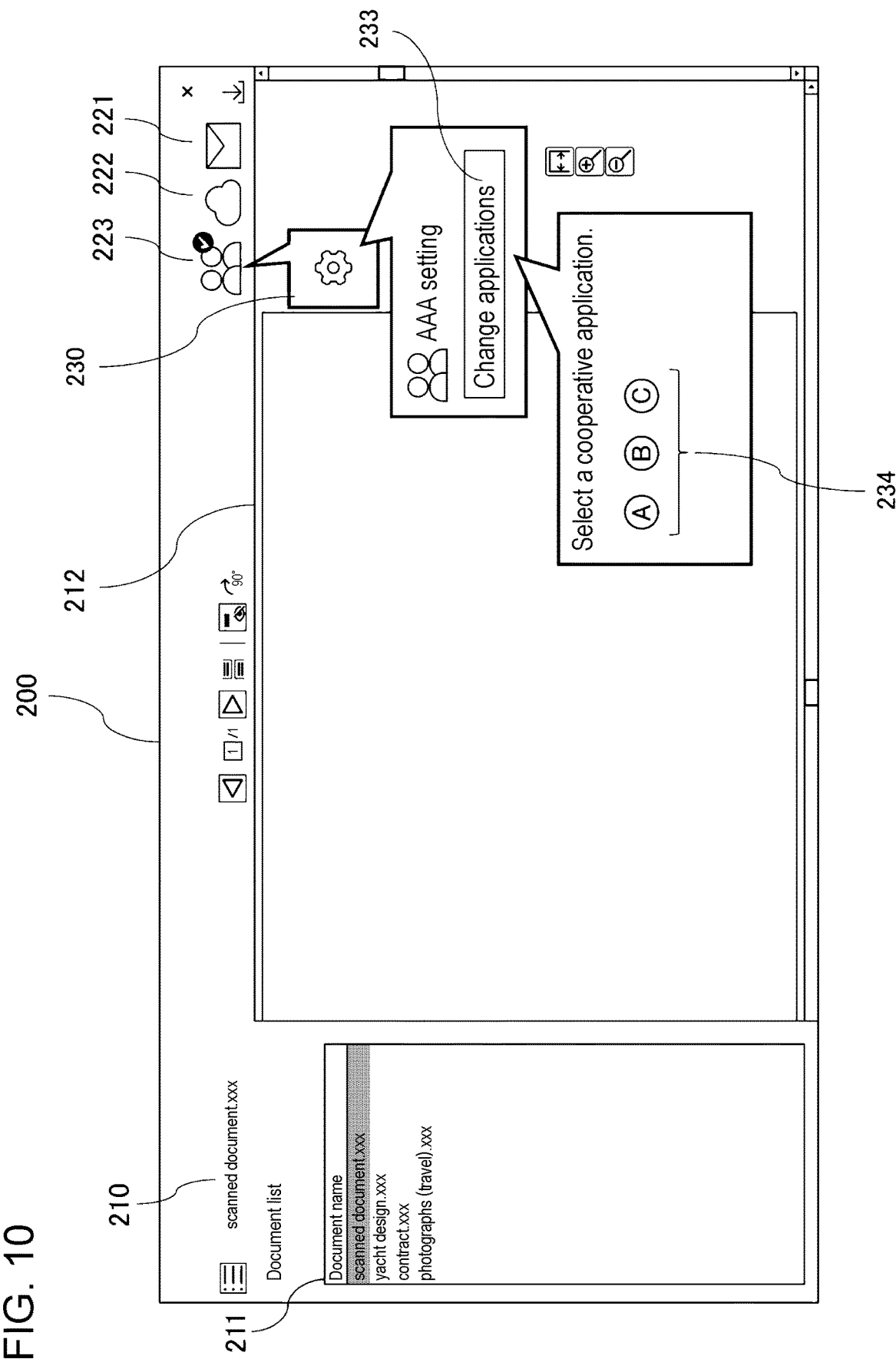
FIG. 10 is a diagram illustrating an example of the user interface displayed by the information processing apparatus.

The information processing apparatus 10 may register plural applications to be used to transmit document data. FIG. 10 is a diagram illustrating an example of the user interface displayed by the information processing apparatus 10. FIG. 10 illustrates an example in which a switch button 233 for changing applications is displayed in a state in which applications to be used to transmit document data have been registered.

Figure 11:
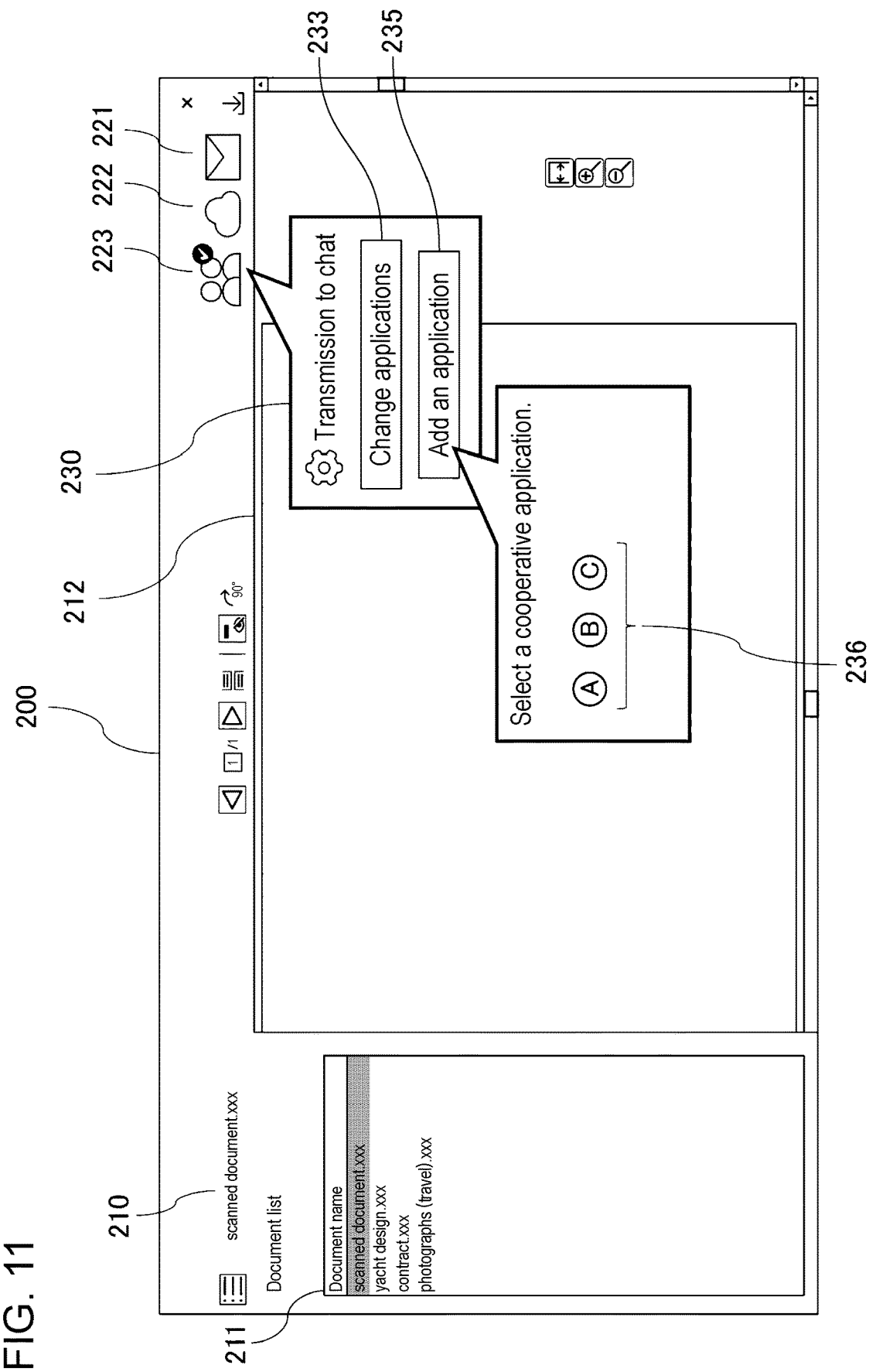
FIG. 11 is a diagram illustrating an example of the user interface displayed by the information processing apparatus.

FIG. 11 is a diagram illustrating an example of the user interface displayed by the information processing apparatus 10. FIG. 11 illustrates an example in which the switch button 233 for changing applications and a registration button 235 for registering an application are displayed in a state in which applications to be used to transmit document data have been registered. In addition, FIG. 11 illustrates an example in which a list of applications to be added is displayed as an icon 236 in response to the registration button 235 being selected by the user.

Figure 12:
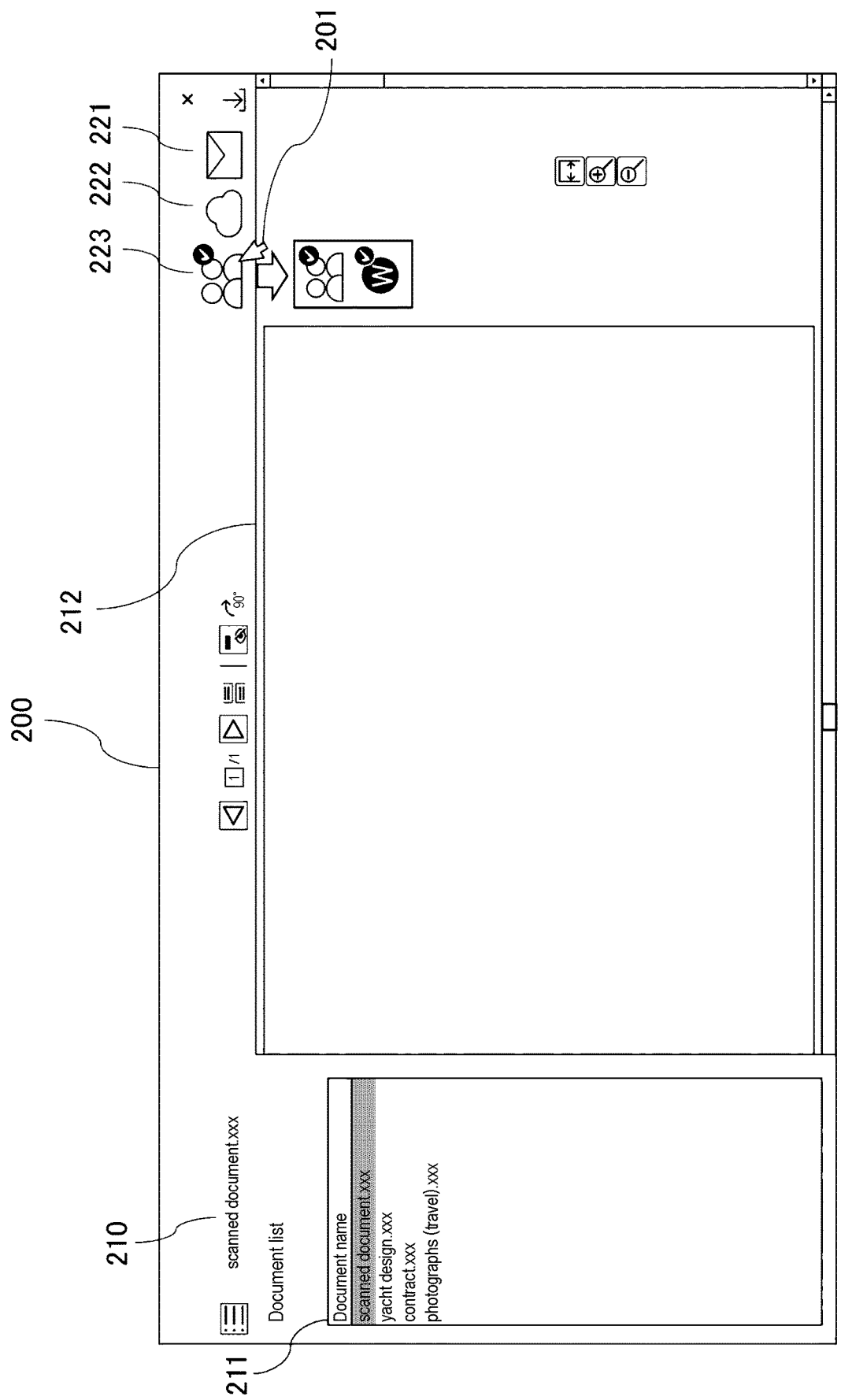
FIG. 12 is a diagram illustrating an example of the user interface displayed by the information processing apparatus.
Figure 13:
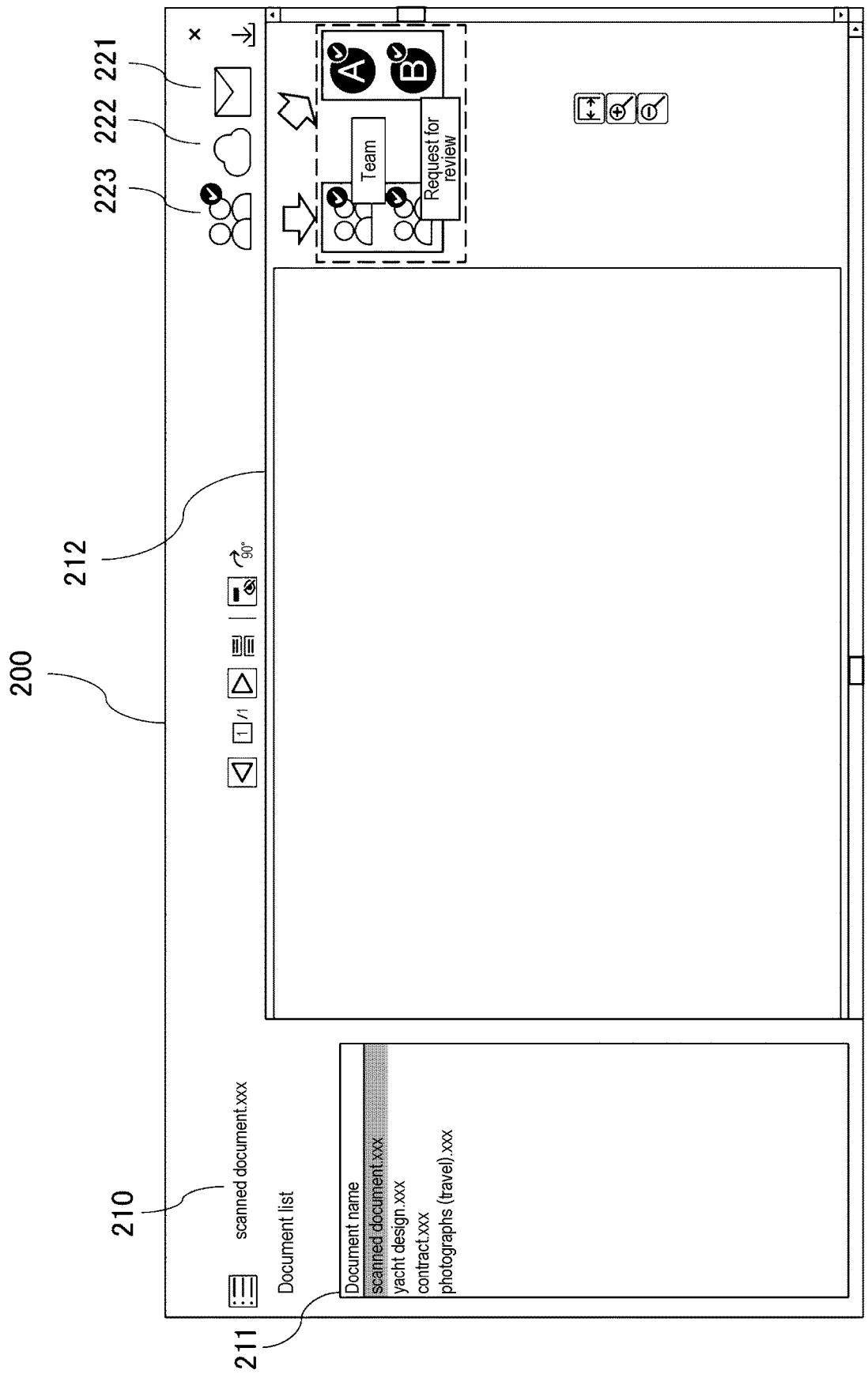
FIG. 13 is a diagram illustrating an example of the user interface displayed by the information processing apparatus.

FIG. 12 is a diagram illustrating an example of the user interface displayed by the information processing apparatus 10. FIG. 12 illustrates an example in which the user has selected the icon 223 in a state in which plural applications to be used to transmit document data have been registered. In response to the icon 223 being selected by the user in the state in which plural applications to be used to transmit document data have been registered, the information processing apparatus 10 displays all the icons of the applications to be used to transmit document data. The information processing apparatus 10 may register plural destinations in the same application to be used to transmit document data. FIG. 13 is a diagram illustrating an example of the user interface displayed by the information processing apparatus 10. FIG. 13 illustrates an example in which plural destinations are registered in the same application to be used to transmit document data. The information processing apparatus 10 may display information for identifying the destinations together with the icons, as illustrated in FIG. 13.

Figure 14:
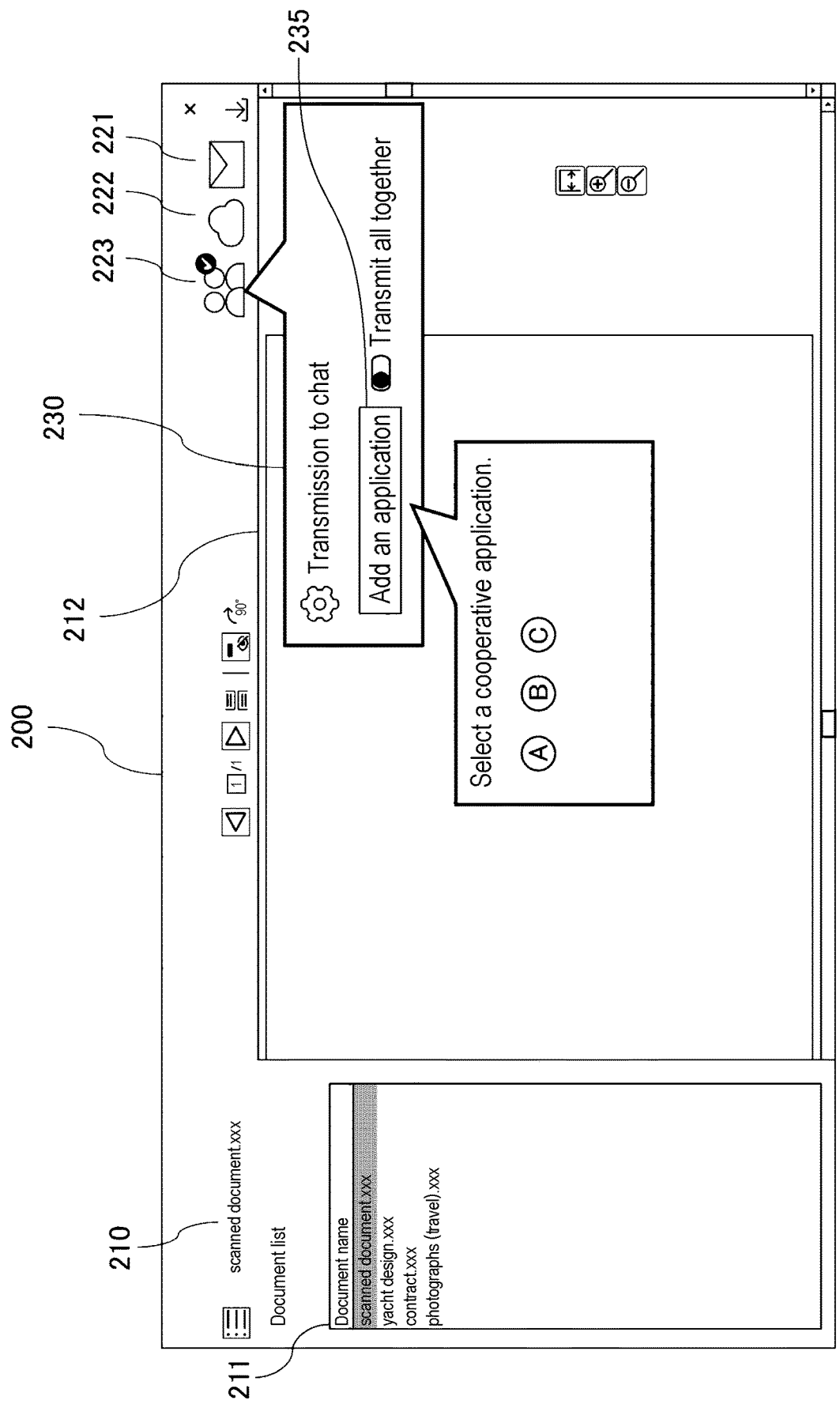
FIG. 14 is a diagram illustrating an example of the user interface displayed by the information processing apparatus.

The information processing apparatus 10 may transmit document data by simultaneously using plural applications in a state in which the plural applications to be used to transmit document data have been registered. FIG. 14 is a diagram illustrating an example of the user interface displayed by the information processing apparatus 10. FIG. 14 illustrates an example in which a screen is displayed, the screen being used to set whether document data is to be transmitted at one time by using plural applications when an application to be used to transmit document data is additionally registered.

Figure 15:
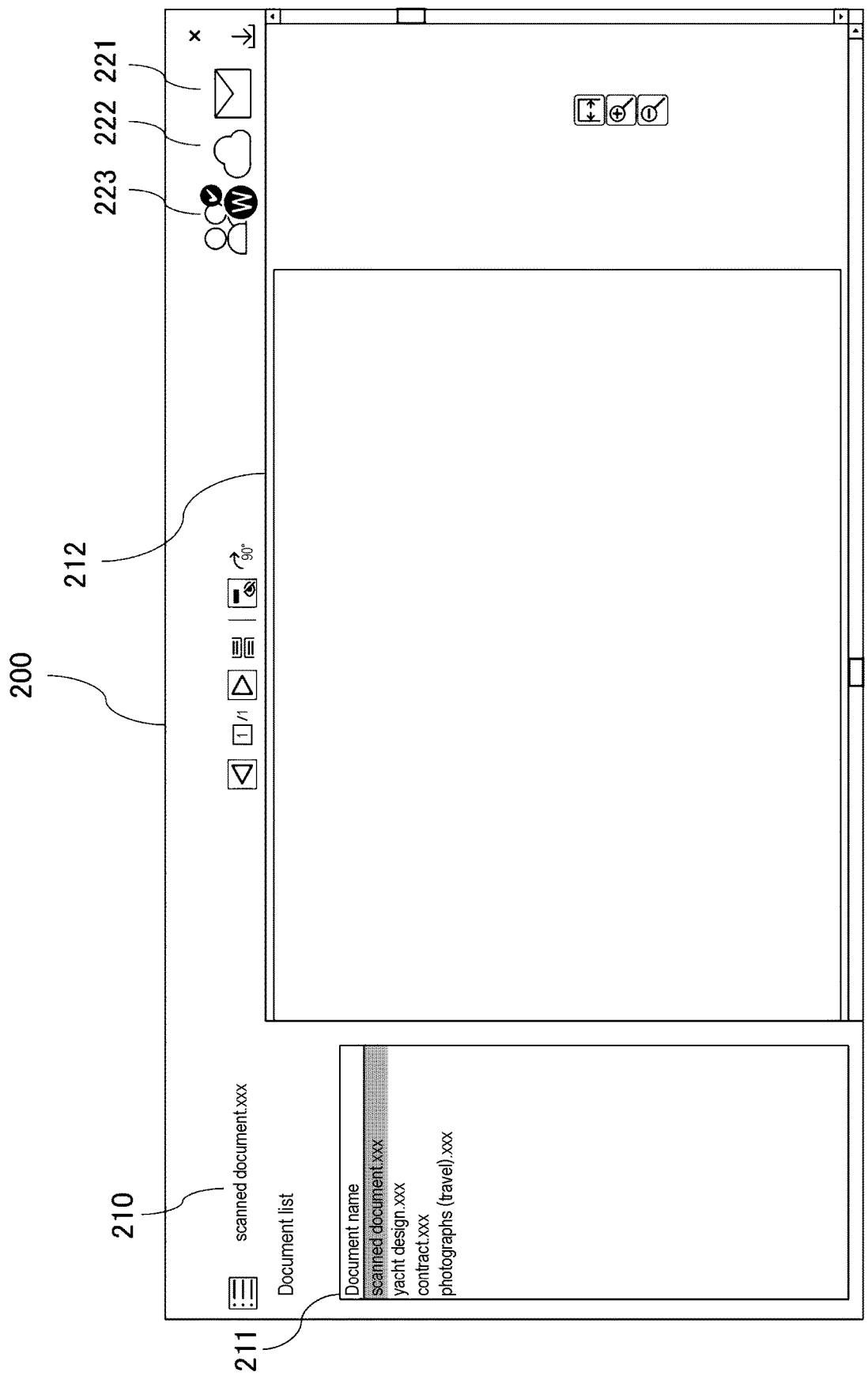
FIG. 15 is a diagram illustrating an example of the user interface displayed by the information processing apparatus.

FIG. 15 is a diagram illustrating an example of the user interface displayed by the information processing apparatus 10. FIG. 15 illustrates an example in which the icon 223 indicates that a setting has been made to transmit document data by simultaneously using plural applications in a state in which the plural applications to be used to transmit document data have been registered. In the example in FIG. 15, the icons of two applications overlapped each other are displayed as the icon 223.

Figure 16:
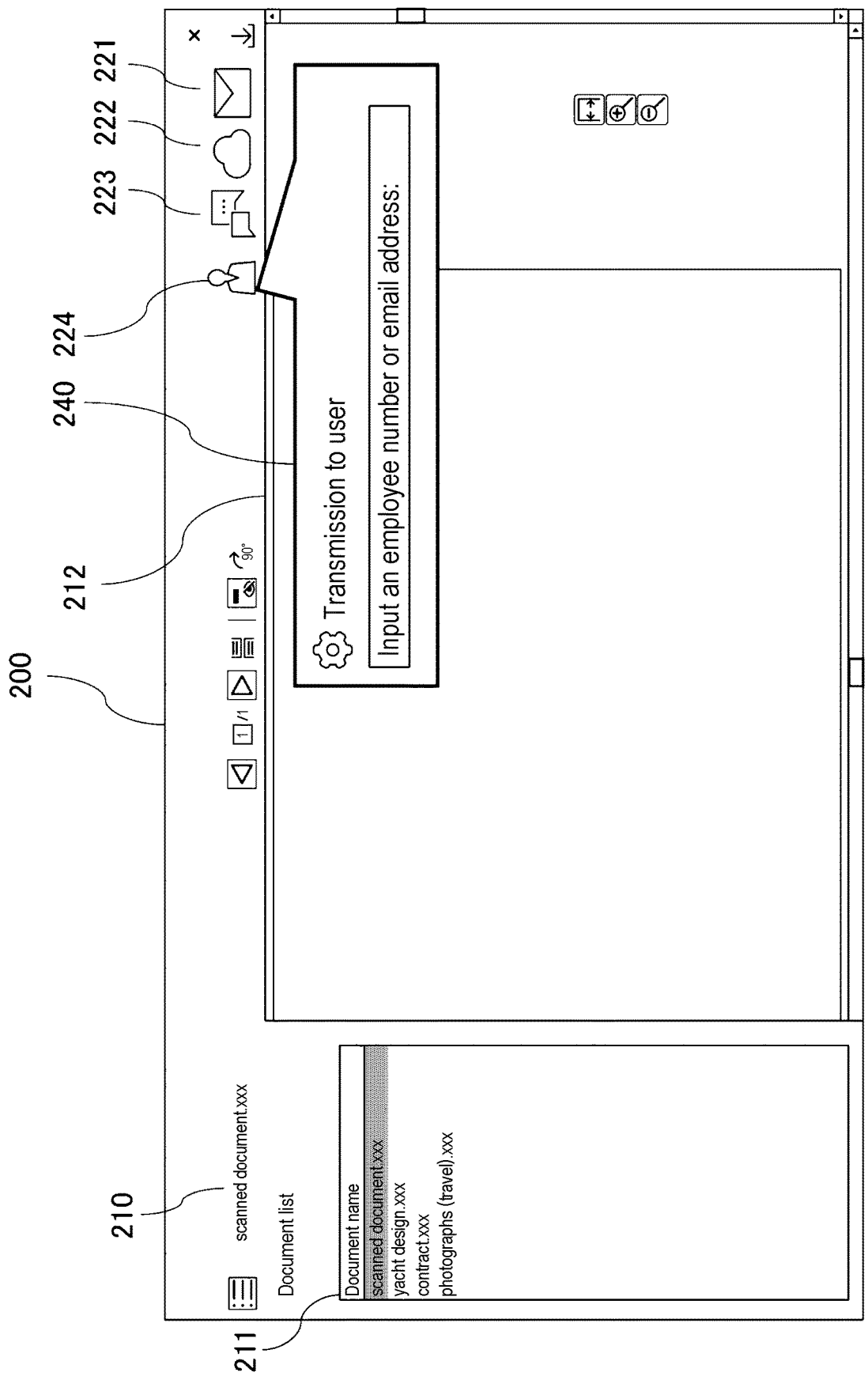
FIG. 16 is a diagram illustrating an example of the user interface displayed by the information processing apparatus.

The document management application has a function of designating a destination user and transmitting document data. FIG. 16 is a diagram illustrating an example of the user interface displayed by the information processing apparatus 10. FIG. 16 illustrates an example in which a screen 240 for designating a destination user is displayed on the user interface 200 in response to an icon 224 for designating a destination user being selected by the user. In the present exemplary embodiment, an example is illustrated in which a text box for inputting an employee number or an email address is displayed on the screen 240.

In response to a destination user being designated by the user, the information processing apparatus 10 proposes a transmission method suitable for the designated destination user. For example, the information processing apparatus 10 proposes, as the transmission method suitable for the destination user, a transmission method that is used by the destination user most frequently.

Figure 17:
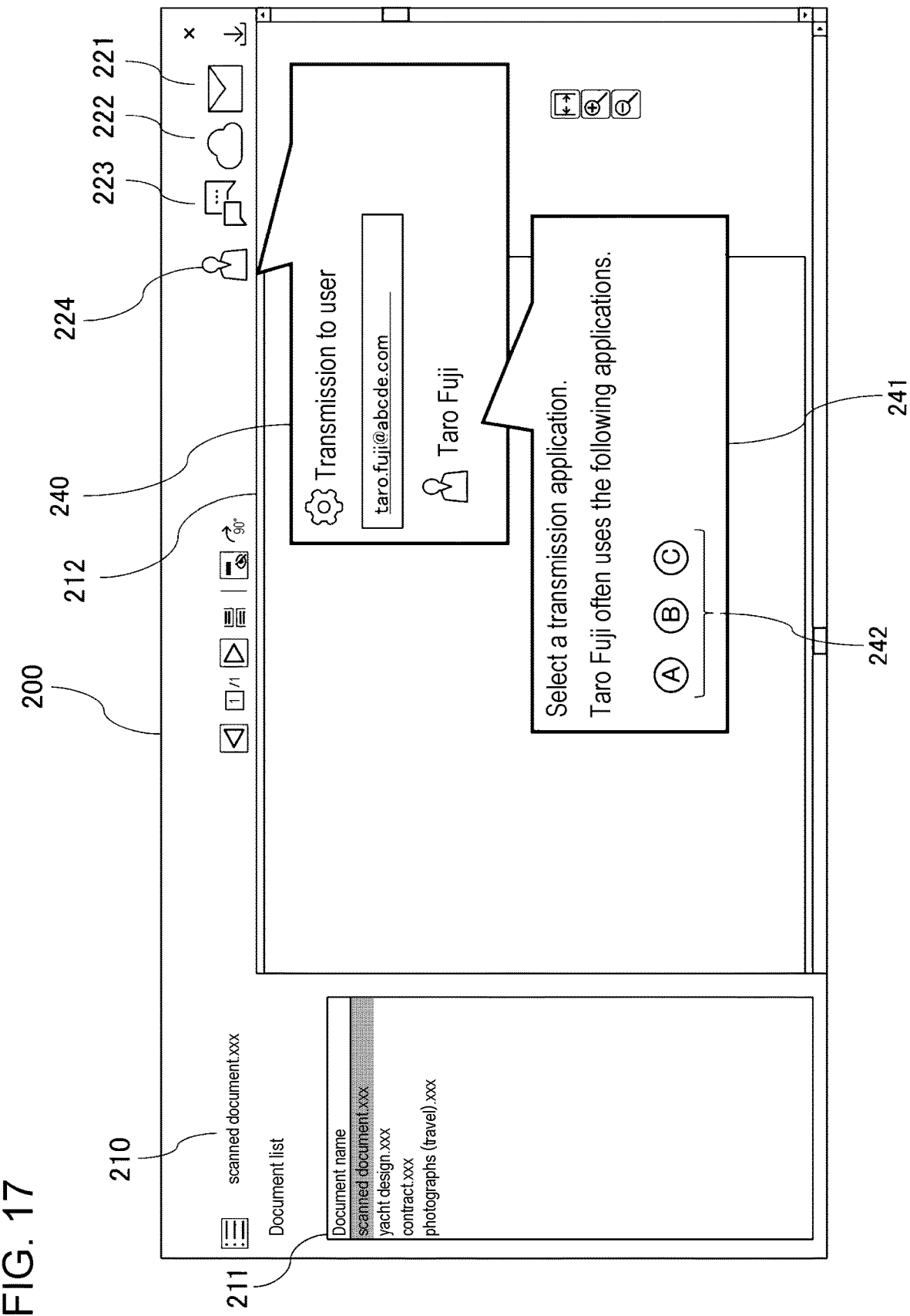
FIG. 17 is a diagram illustrating an example of the user interface displayed by the information processing apparatus.

FIG. 17 is a diagram illustrating an example of the user interface displayed by the information processing apparatus 10. FIG. 17 illustrates an example in which the applications most frequently used by the destination user are proposed as suitable transmission methods for document data in response to the destination user being designated. In the example in FIG. 17, the information processing apparatus 10 displays, on a screen 241, an icon 242 of the applications frequently used by the destination user. The user of the information processing apparatus 10 selects one of the applications proposed by the information processing apparatus 10, thereby being able to more easily select the transmission method for transmitting document data to the destination user than in a case where there are no guidelines for selecting a transmission method.

Now, a description will be given of a method for proposing a transmission method by the transmission method proposing unit 103 of the information processing apparatus 10. The transmission method proposing unit 103 proposes a transmission method for transmitting document data to the destination user by referring to the use frequency management database 22 of the server 20.

Figure 18:
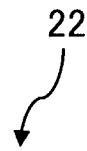
FIG. 18 is a diagram illustrating an example of data stored in a use frequency management database.

FIG. 18 is a diagram illustrating an example of the data stored in the use frequency management database 22 of the server 20. In the example illustrated in FIG. 18, the values of the numbers of times of use of the individual applications by five users, user A to user E, are stored in the use frequency management database 22. As the numbers of times of use, the numbers of times of startup, the numbers of times of transmission, the numbers of times of reception, or the like are used. In the example in FIG. 18, it is assumed that the values of the numbers of times of startup are stored. The use frequency management database 22 may hold the values of the numbers of times of startup, the values of the numbers of times of transmission, and the values of the numbers of times of reception. The use frequency management database 22 may hold the values of the numbers of times of startup, the values of the numbers of times of transmission, and the values of the numbers of times of reception in the same table or different tables.

The transmission method proposing unit 103 refers to the use frequency management database 22 and proposes, for example, a most-frequently-used application as a transmission method for the user. In a case where user A is designated as a destination by the user of the information processing apparatus 10, the transmission method proposing unit 103 refers to the use frequency management database 22 and proposes "application C" having the largest number of times of use as a transmission method for user A.

In the example in FIG. 18, regarding user B, there is no large difference in the number of times of use among "application A", "application B", and "application C". As illustrated in the example in FIG. 18, in a case where the difference between a most-frequently-used transmission method and a second-most-frequently-used transmission method is smaller than or equal to a predetermined threshold, the transmission method proposing unit 103 may propose "application A" having the largest number of times of use as a transmission method for user B, or may propose all of "application A", "application B", and "application C" as transmission methods for user B.

Figure 19:
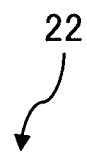
FIG. 19 is a diagram illustrating an example of data stored in the use frequency management database.

FIG. 19 is a diagram illustrating an example of the data stored in the use frequency management database 22 of the server 20. In the example illustrated in FIG. 19, the values of the numbers of times of use of the individual cloud storage services by five users, user A to user E, are stored in the use frequency management database 22.

In a case where the use frequency management database 22 holds the values of the numbers of times of startup, the values of the numbers of times of transmission, and the values of the numbers of times of reception, the transmission method proposing unit 103 may add the individual numbers of times and propose the application having the largest number of times as a transmission method for the user. In the case of adding the individual numbers of times, the transmission method proposing unit 103 may apply predetermined weights to the individual numbers of times before addition. The values of weights are not specified. For example, under the assumption that the numbers of times of startup have highest priority, the largest weight may be applied to the numbers of times of startup, the second largest weight may be applied to the numbers of times of reception, and the smallest weight may be applied to the numbers of times of transmission.

The use frequency management database 22 may store information regarding the numbers of times of use as illustrated in FIG. 18 and FIG. 19. The range over which the numbers of times of use are counted may be an entire period, or may be limited to a predetermined period, for example, the latest half year or the latest one year.

The transmission method proposing unit 103 may propose a transmission method for the destination user, based on the numbers of times of use of individual transmission methods between the destination user and another user as described above, as well as the information regarding the numbers of times of use of individual transmission methods of the destination user. The transmission method proposing unit 103 may propose a transmission method designated by the destination user in advance as a transmission method for the destination user.

In a case where the user of the information processing apparatus 10 transmits document data to the same destination user many times, it is troublesome to input the information of the destination user and set a transmission method suitable for the destination user at every transmission. The document management application executed by the information processing apparatus 10 may be capable of registering a frequent destination user and information regarding a transmission method to be used for the frequent destination user as favorites.

Figure 20:
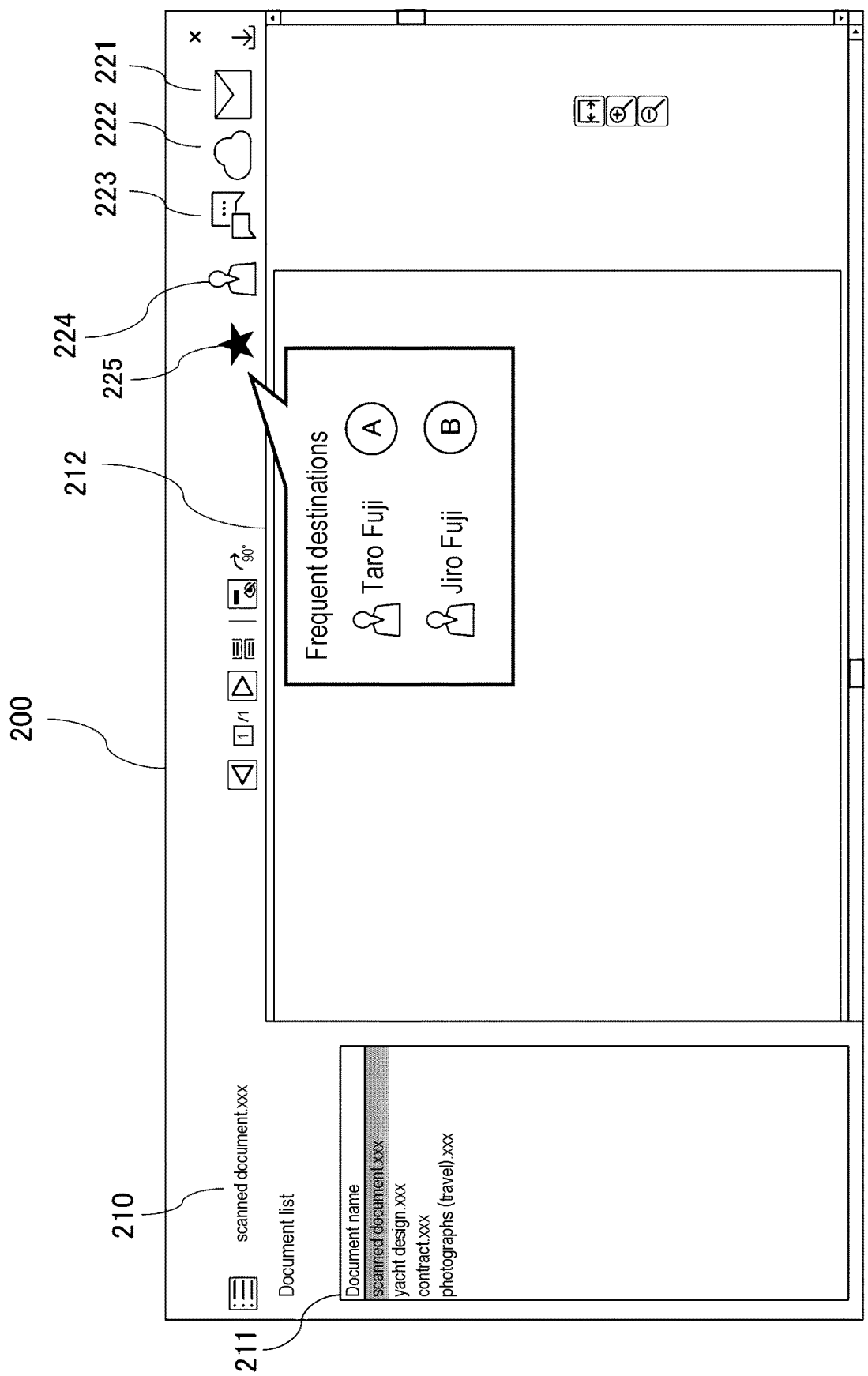
FIG. 20 is a diagram illustrating an example of the user interface displayed by the information processing apparatus.

FIG. 20 is a diagram illustrating an example of the user interface displayed by the information processing apparatus 10. FIG. 20 illustrates an example of a state in which frequent destination users and information regarding transmission methods to be used for the frequent destination users are registered as favorites. In response to a star-shaped icon 225 being selected by the user of the information processing apparatus 10, the information processing apparatus 10 displays, on the user interface 200, the destination users and the transmission methods usable for the destination users registered as favorites by the user of the information processing apparatus 10.

In this case, when the user has selected the icon 225, a transmission method registered for a destination user may be different from a transmission method most frequently used by the destination user. For example, user A uses "application C" most frequently at a certain time point, as illustrated in FIG. 18, and thus "application C" is registered as a transmission method for user A. However, after time elapses, user A uses an application different from "application C" (for example, "application A") most frequently.

In such a case where the transmission method to be proposed is different between a time point when a transmission method for the destination user is registered and a time point when document data is to be transmitted, the transmission method proposing unit 103 may present, on the user interface 200, that the transmission method registered for the destination user is different from the transmission method most frequently used by the destination user. Accordingly, the user is able to determine, by viewing the presentation on the user interface 200, whether to change the transmission method to be used for the user registered as favorites.

The user selects one or more pieces of document data from the list of document data displayed in the document list 211, drags the selected document data to the place of the icons 221, 222, and 223, and drops the selected document data on the place of the icons 221, 222, and 223. Accordingly, the document management application provides a function of transmitting the document data to another user.

Figure 21:
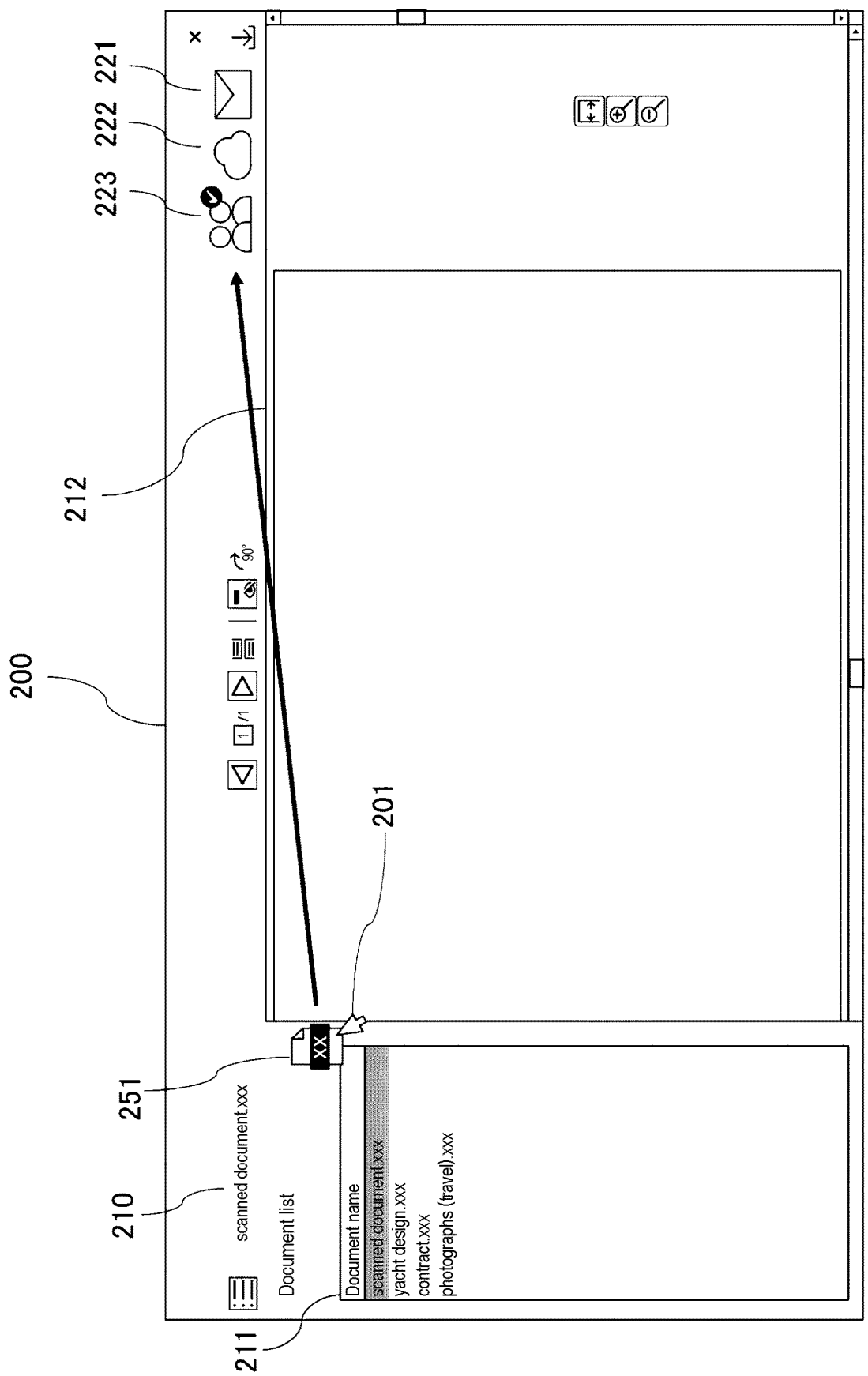
FIG. 21 is a diagram illustrating an example of the user interface displayed by the information processing apparatus.

FIG. 21 is a diagram illustrating an example of the user interface displayed by the information processing apparatus 10. FIG. 21 illustrates a state in which a piece of document data 251 is selected from the list of document data displayed in the document list 211, dragged to the icon 223, and dropped on the icon 223.

Figure 22:
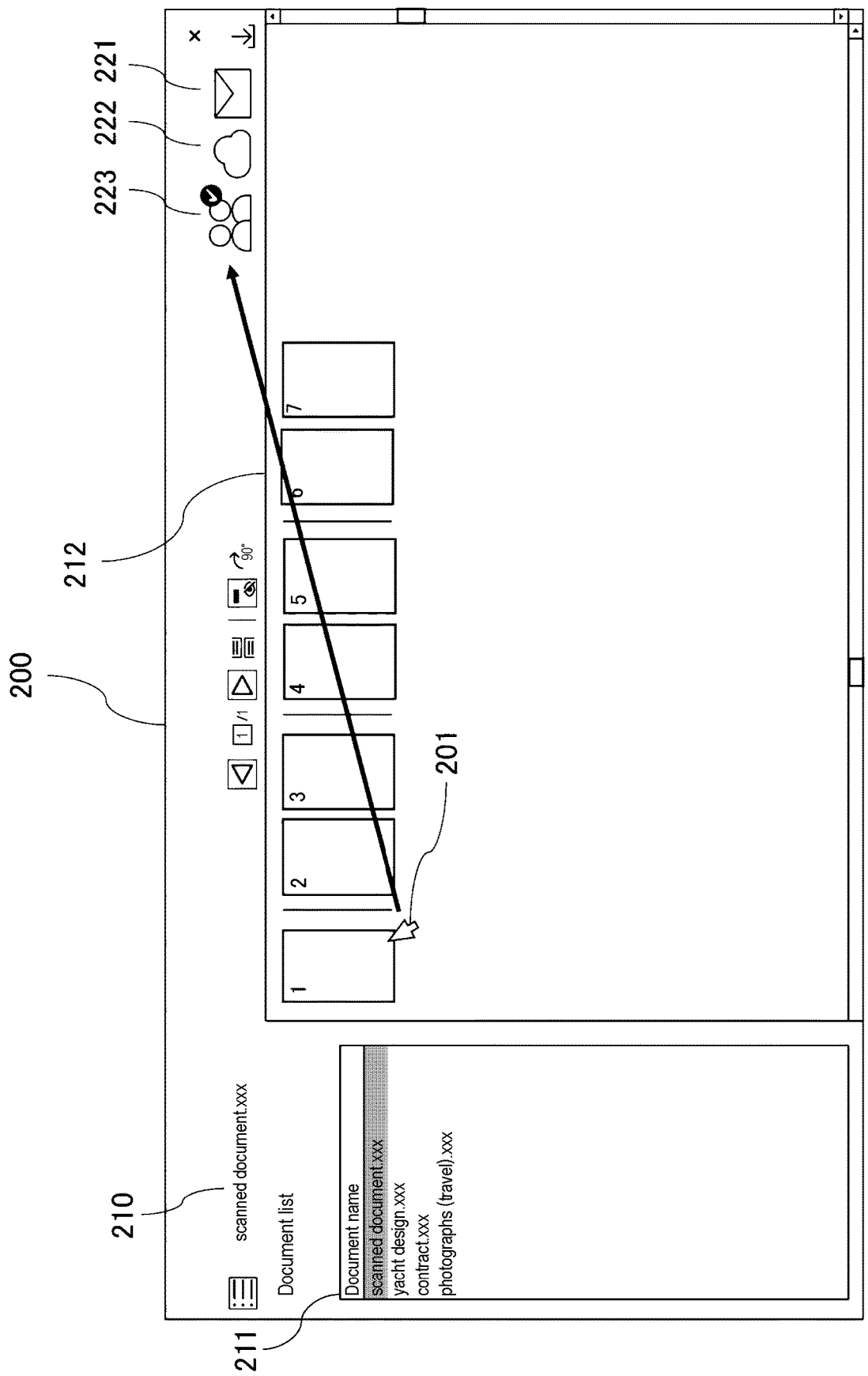
FIG. 22 is a diagram illustrating an example of the user interface displayed by the information processing apparatus.

The document management application provides a function of transmitting one or some pages of the document data to another user. FIG. 22 is a diagram illustrating an example of the user interface displayed by the information processing apparatus 10. FIG. 22 illustrates an example in which a list of pages of the document data selected by the user is displayed in the document data display region 212. In response to the first page being selected and dragged to the icon 223 by the user, the document management application transmits only the first page to another user.

Figure 23:
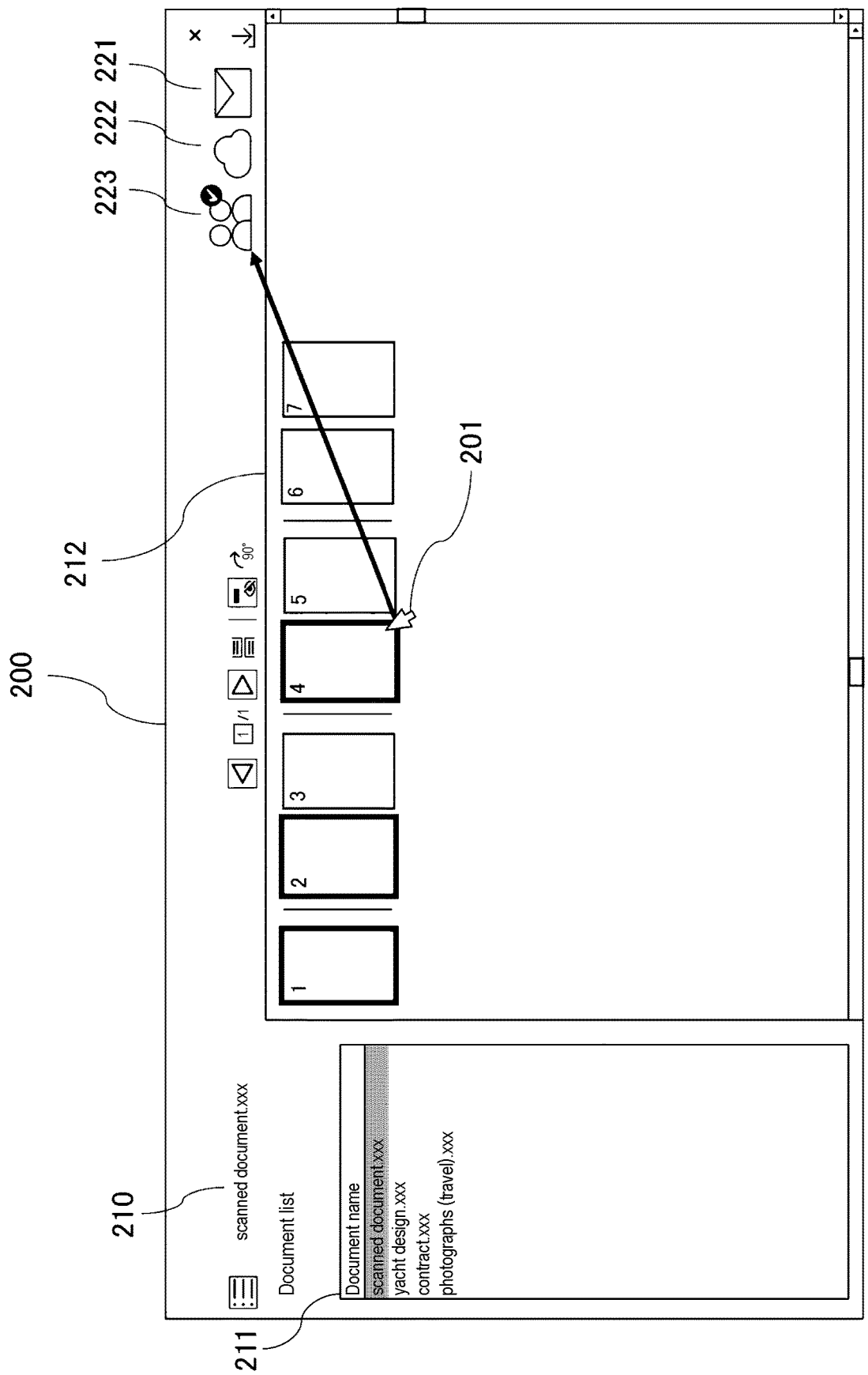
FIG. 23 is a diagram illustrating an example of the user interface displayed by the information processing apparatus.

In a case where the user has selected plural pages to be transmitted, the document management application transmits the pages selected by the user to another user. FIG. 23 is a diagram illustrating an example of the user interface displayed by the information processing apparatus 10. FIG. 23 illustrates an example in which a list of pages of the document data selected by the user is displayed in the document data display region 212. In response to the first page, the second page, and the fourth page being selected and dragged to the icon 223 by the user, the document management application transmits only the first page, the second page, and the fourth page to another user.

Figure 24:
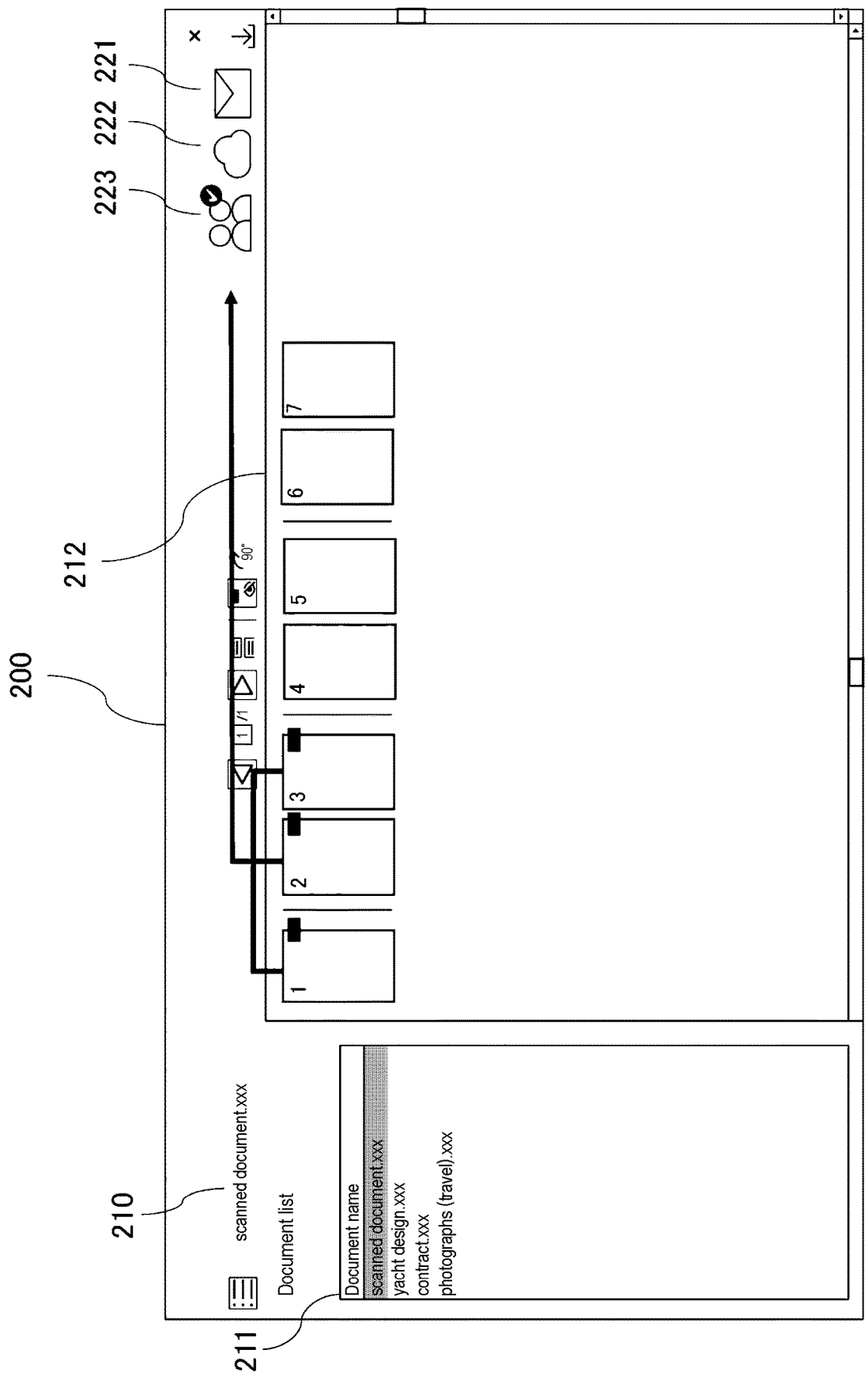
FIG. 24 is a diagram illustrating an example of the user interface displayed by the information processing apparatus.

The document management application may have a function of transmitting a page having a specific attribute to another user. FIG. 24 is a diagram illustrating an example of the user interface displayed by the information processing apparatus 10. FIG. 24 illustrates an example in which pages having a specific attribute and pages not having a specific attribute are displayed in the document data display region 212. In the example in FIG. 24, the first to third pages are pages having a specific attribute.

Figure 25:
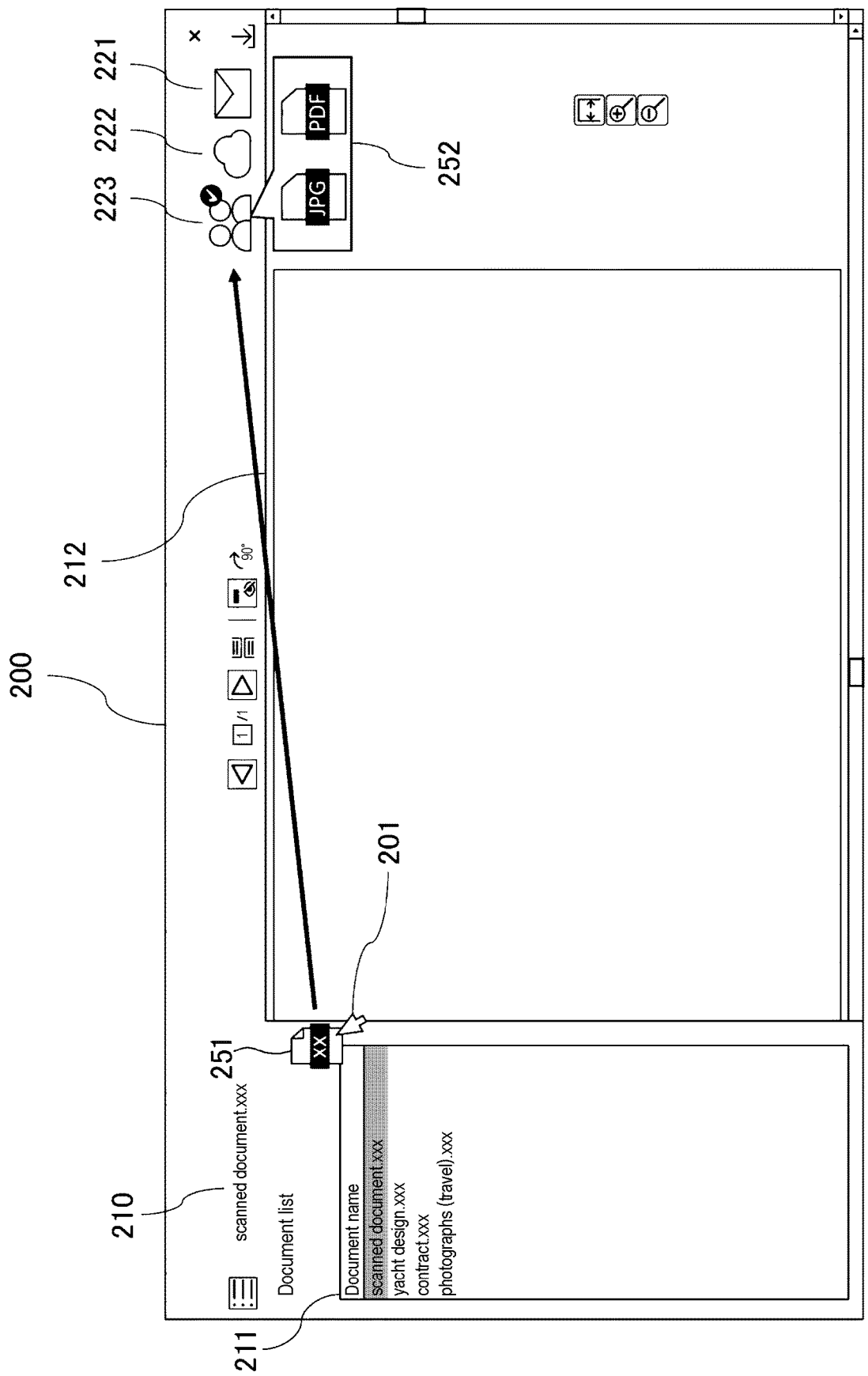
FIG. 25 is a diagram illustrating an example of the user interface displayed by the information processing apparatus.

The document management application may have a function of converting the format of document data before transmitting the document data to another user. FIG. 25 is a diagram illustrating an example of the user interface displayed by the information processing apparatus 10. FIG. 25 illustrates a state in which a piece of document data 251 is selected from the list of document data displayed in the document list 211, dragged to the icon 223, and dropped on the icon 223. The document management application may display a screen 252 for converting the dragged document data 251 to, for example, image data of the JPEG format or data of the PDF format before transmitting the document data 251 to another user, as illustrated in FIG. 25. In a case where the user has simply moved the mouse cursor 201 to the icon 223, the document management application may display a setting screen for converting the format of document data on the user interface 200 in a pop-up manner.

Figure 26:
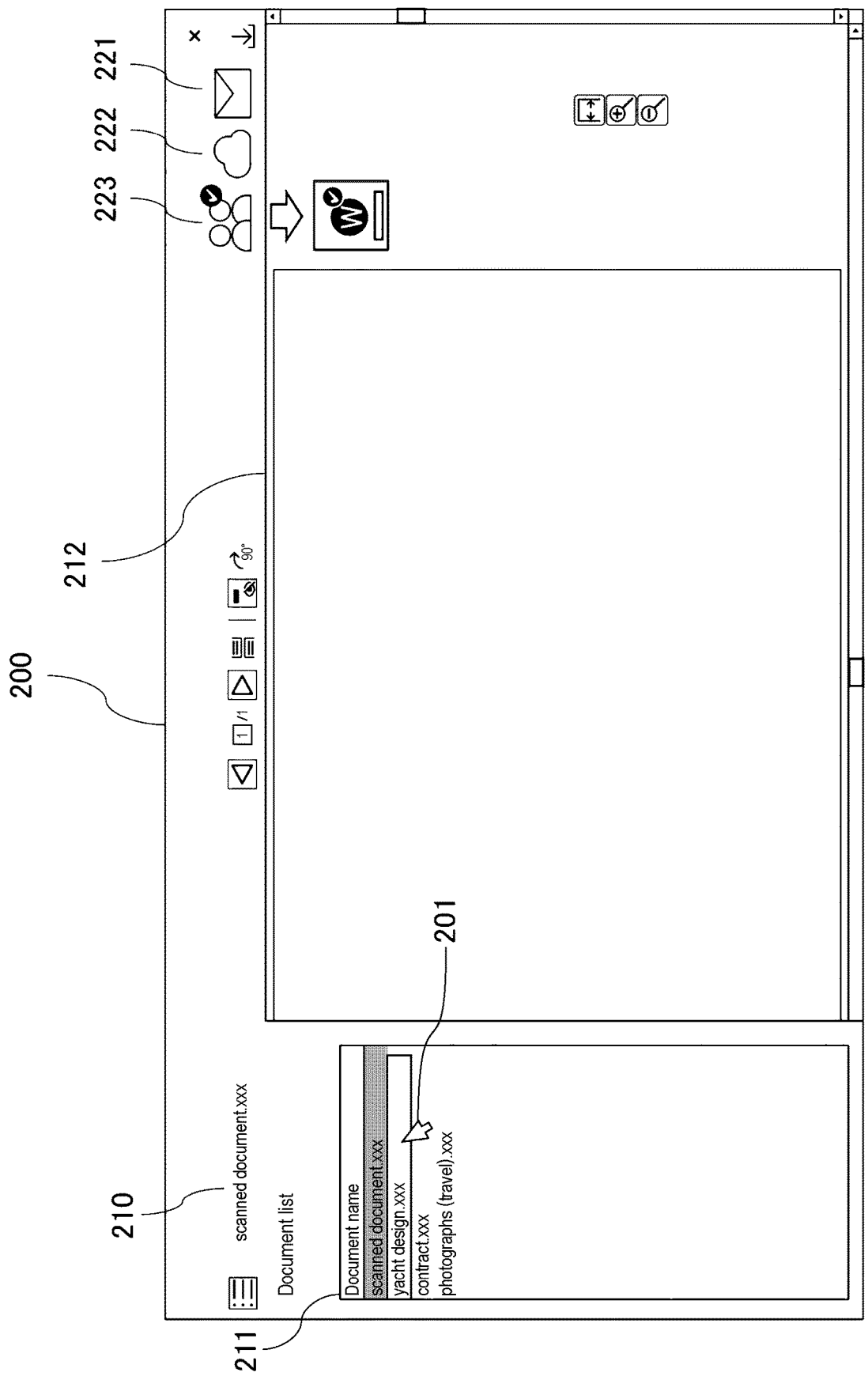
FIG. 26 is a diagram illustrating an example of the user interface displayed by the information processing apparatus.

The document management application may have a function of changing the transmission method to a previously-used transmission method at the time of transmitting document data to another user. FIG. 26 is a diagram illustrating an example of the user interface displayed by the information processing apparatus 10. FIG. 26 illustrates an example in which one piece of document data 251 is selected from the list of document data displayed in the document list 211. In response to the document data 251 being selected, the document management application may change the display of the icon 223 so that the previously-used transmission method is used.

The document management application may have a function of automatically changing the transmission method in accordance with the contents of document data at the time of transmitting the document data to another user. For example, the document management application may automatically change the transmission method so that the transmission method varies between a case where document data to be shared within a company is selected and a case where document data to be transmitted to the outside of the company is selected.

Figure 27:
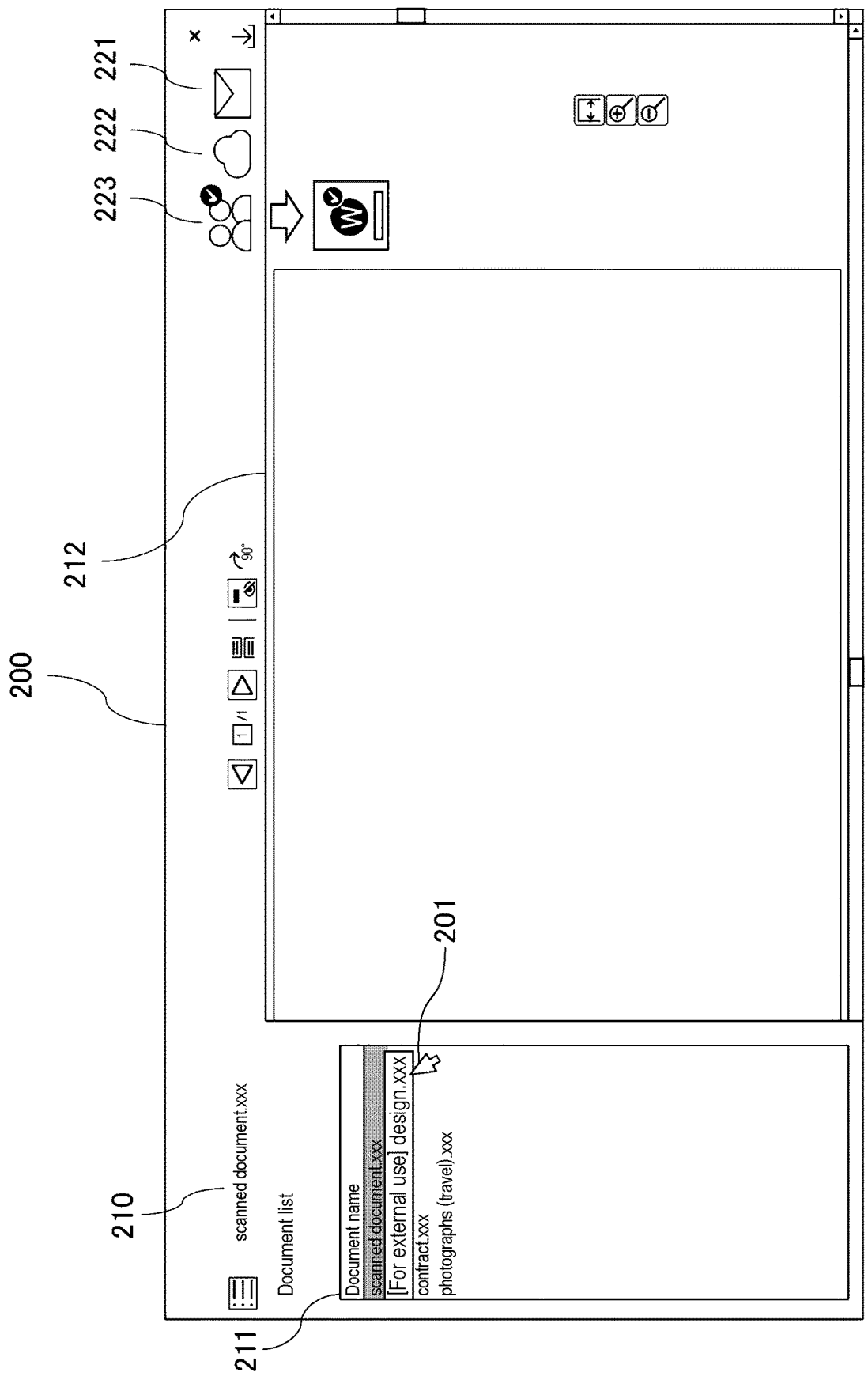
FIG. 27 is a diagram illustrating an example of the user interface displayed by the information processing apparatus.

FIG. 27 is a diagram illustrating an example of the user interface displayed by the information processing apparatus 10. FIG. 27 illustrates an example in which one piece of document data 251 is selected from the list of document data displayed in the document list 211. For example, in a case where a specific keyword such as "for external use" is included in the file name, the document management application may change the display of the icon 223 so that a transmission method for transmitting document data to the outside of the company is used.

The document management application may have a function of automatically limiting the transmission method in accordance with the contents of document data at the time of transmitting the document data to another user. For example, in a case where document data to be transmitted to the outside of the company has been selected, the document management application may automatically limit a usable transmission method.

Figure 28:
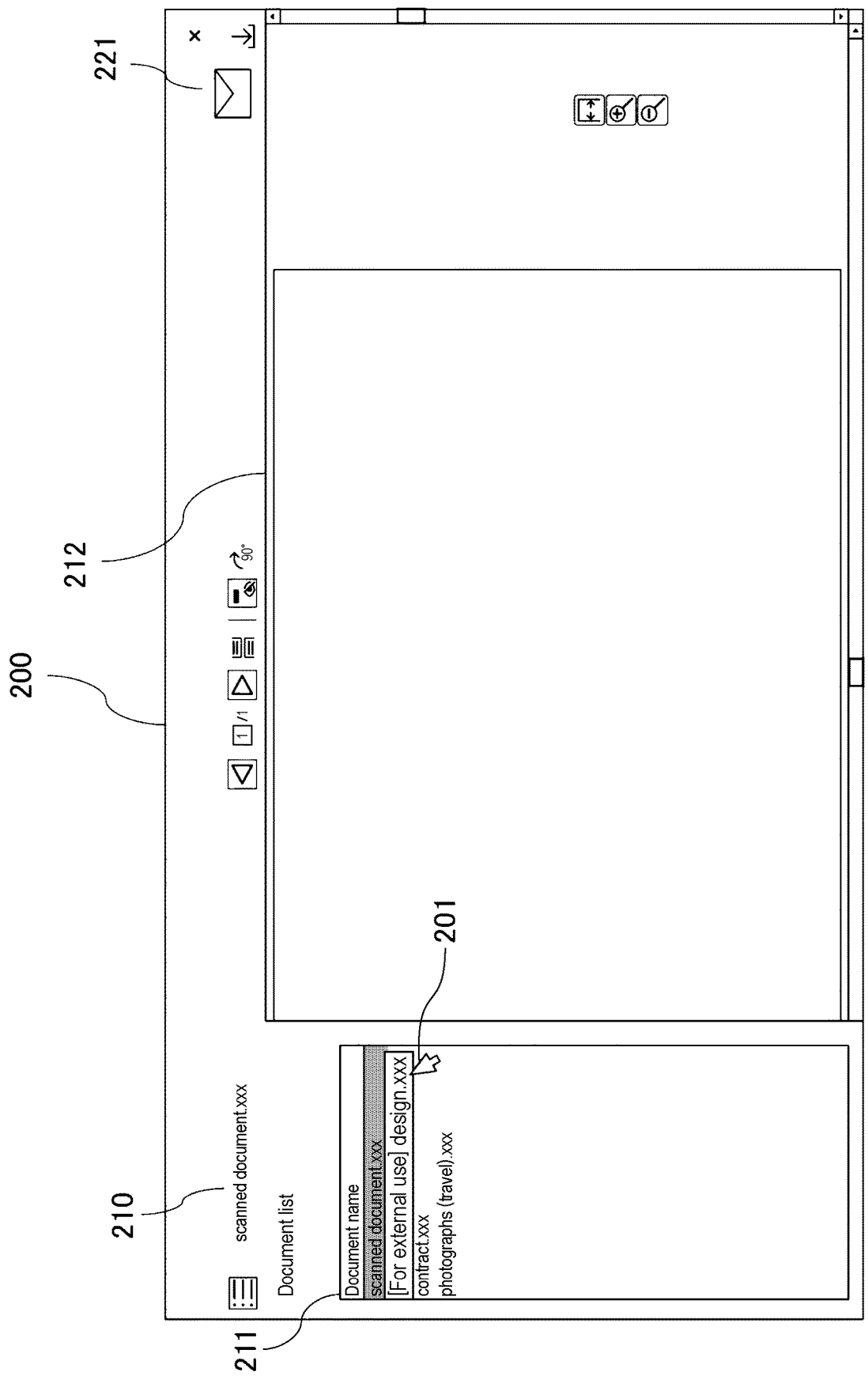
FIG. 28 is a diagram illustrating an example of the user interface displayed by the information processing apparatus.

FIG. 28 is a diagram illustrating an example of the user interface displayed by the information processing apparatus 10. FIG. 28 illustrates an example in which one piece of document data 251 is selected from the list of document data displayed in the document list 211. For example, in a case where a specific keyword such as "for external use" is included in the file name, the document management application may display only the icon 221 so that only email is used.

Figure 29:
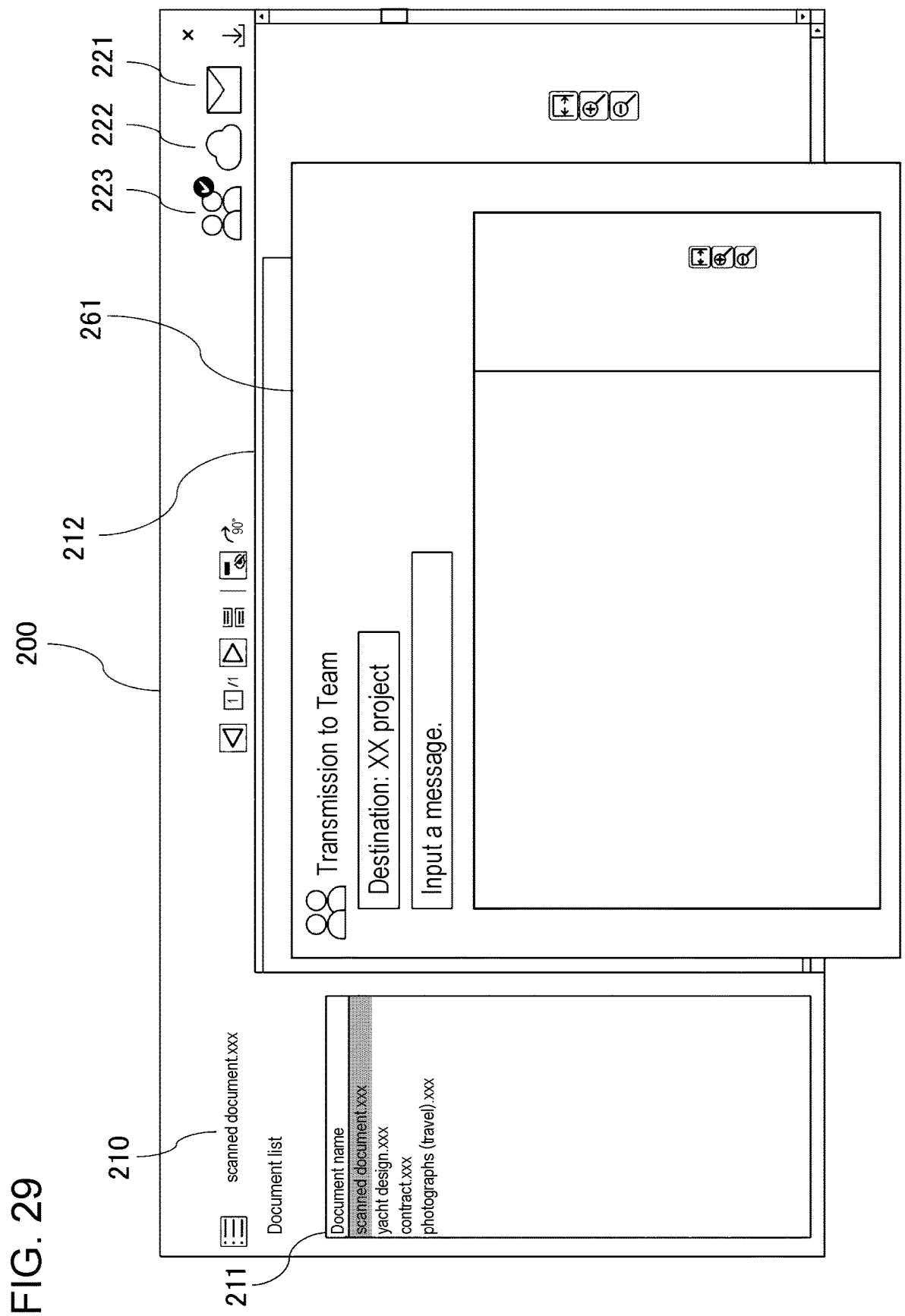
FIG. 29 is a diagram illustrating an example of the user interface displayed by the information processing apparatus.

The document management application may present an input screen for the contents to be transmitted on the user interface 200 at the time of transmitting document data to another user. FIG. 29 is a diagram illustrating an example of the user interface displayed by the information processing apparatus 10. FIG. 29 illustrates an example in which an input screen 261 for inputting the contents to be transmitted is presented on the user interface 200 at the time of transmitting document data to another user.

Figure 30:
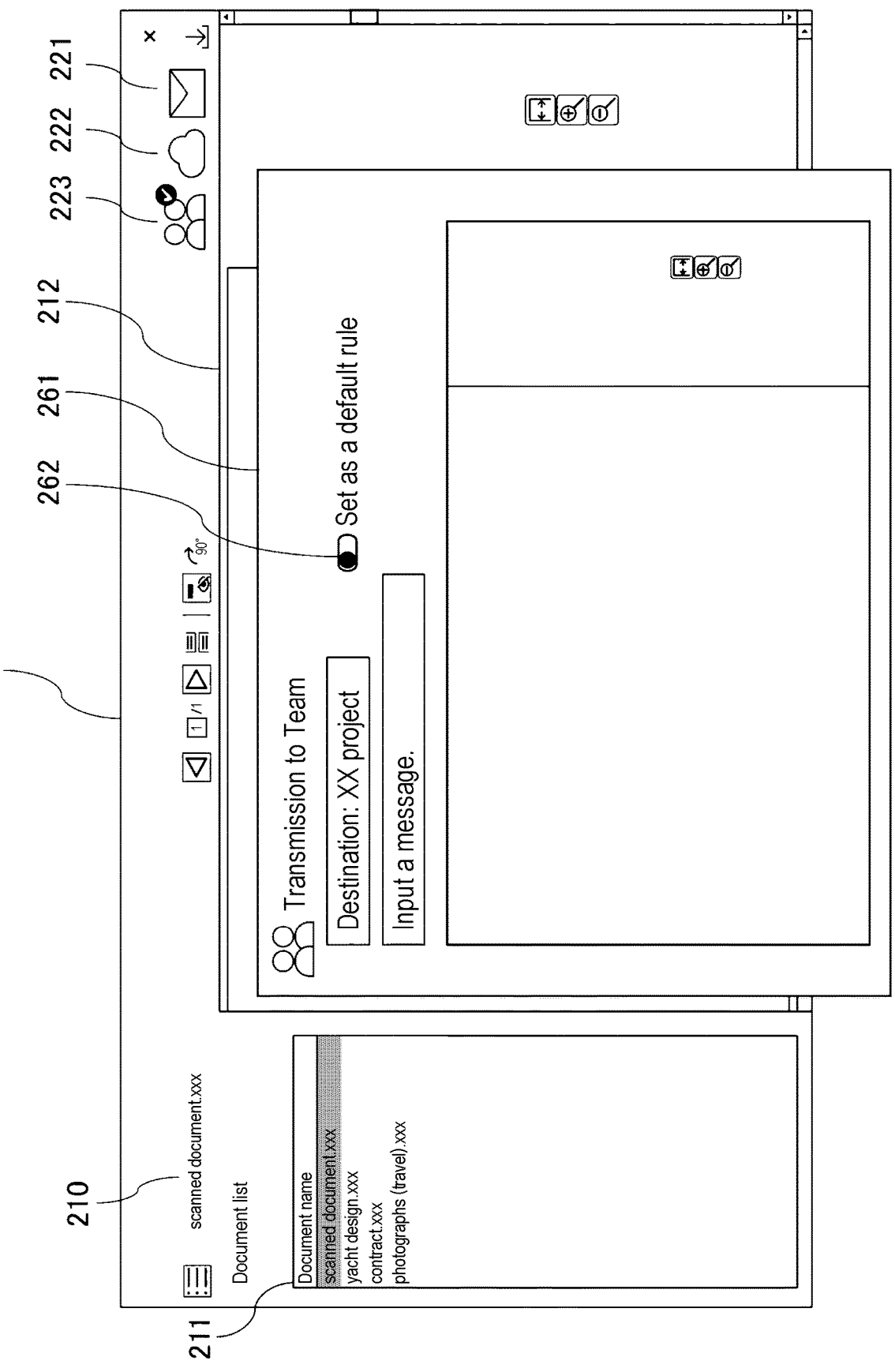
FIG. 30 is a diagram illustrating an example of the user interface displayed by the information processing apparatus.

The document management application may have a function of registering an address and text of a message input on the input screen 261 as default contents. FIG. 30 is a diagram illustrating an example of the user interface displayed by the information processing apparatus 10. FIG. 30 illustrates an example in which the input screen 261 for inputting the contents to be transmitted is presented on the user interface 200 at the time of transmitting document data to another user. In FIG. 30, a button 262 for setting the input contents as a default rule is displayed on the input screen 261.

Figure 31:
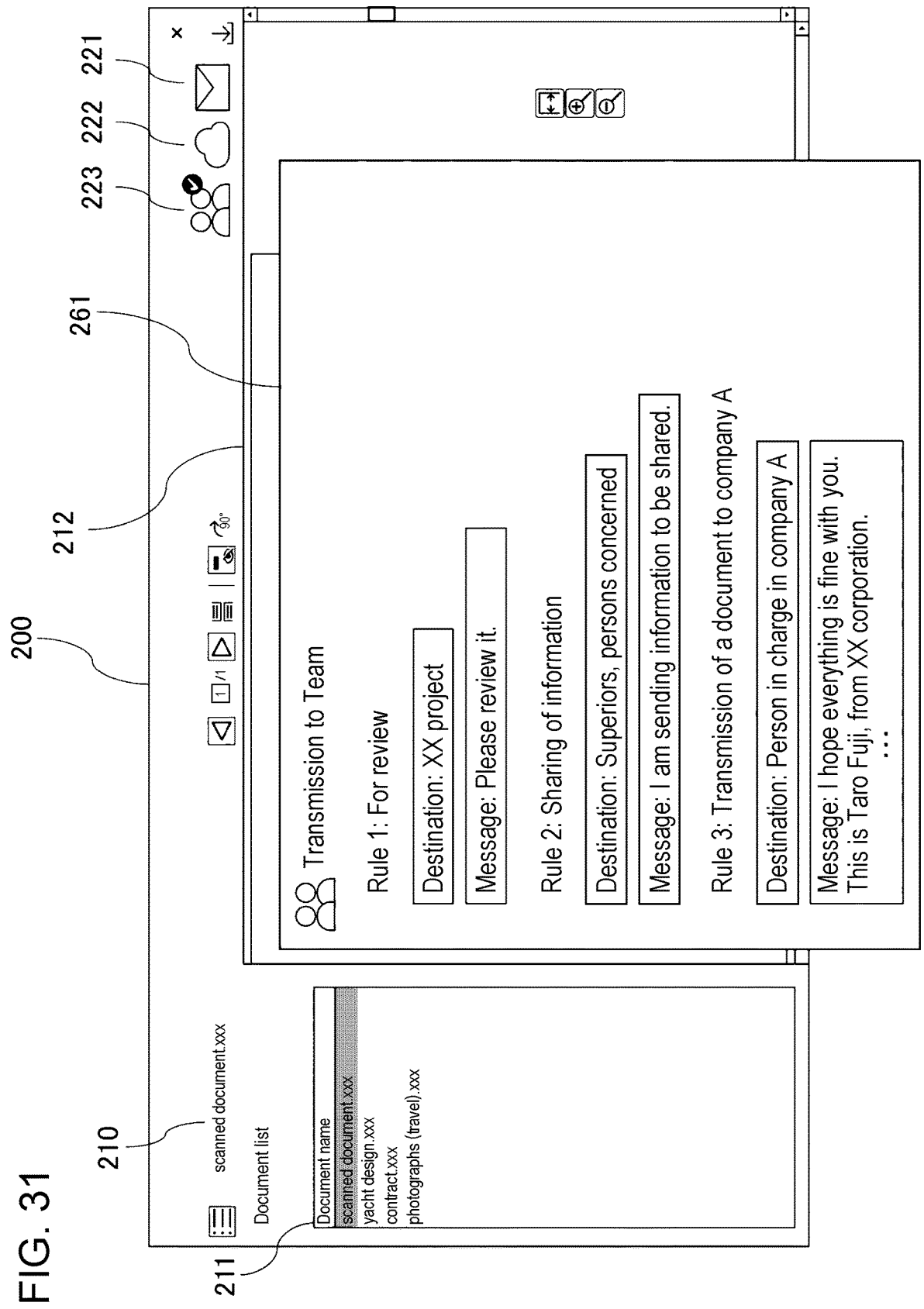
FIG. 31 is a diagram illustrating an example of the user interface displayed by the information processing apparatus.

The document management application may be capable of registering plural transmission rules for transmitting document data to another user. Each transmission rule includes, for example, a destination and text of a message. FIG. 31 is a diagram illustrating an example of the user interface displayed by the information processing apparatus 10. FIG. 31 illustrates an example in which three transmission rules are displayed on the input screen 261. In response to one of the transmission rules being selected by the user, the document management application automatically inputs the destination user and the text of a message.

Figure 32:
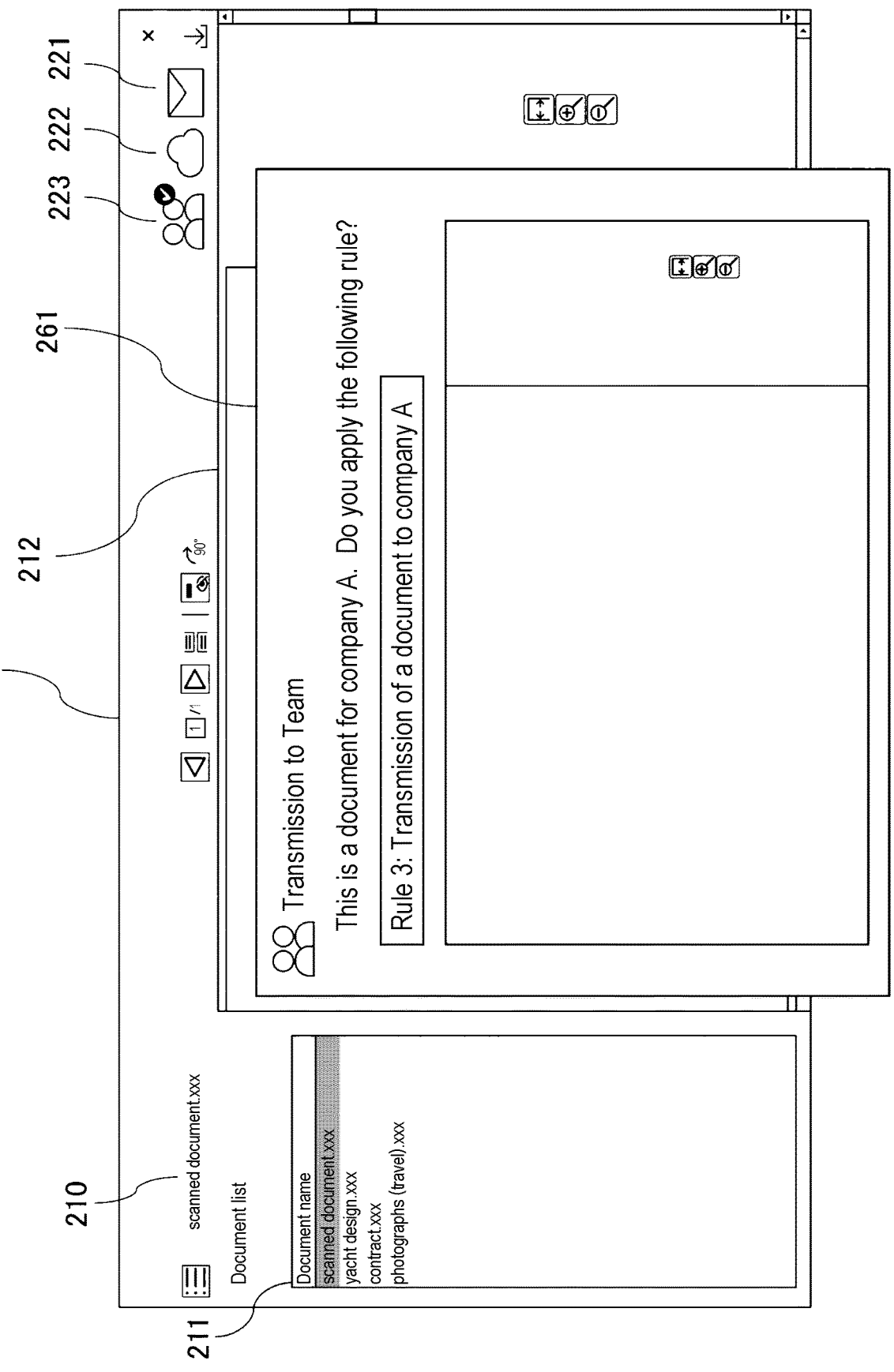
FIG. 32 is a diagram illustrating an example of the user interface displayed by the information processing apparatus.

The document management application may present a message asking whether to select a transmission rule in accordance with the contents of the document data to be transmitted. For example, in a case where text designating a destination, such as "for company A", is included in the file name or contents of the document data to be transmitted, and where the transmission rule for company A is set, the document management application may present a message asking whether to select the transmission rule for company A. FIG. 32 is a diagram illustrating an example of the user interface displayed by the information processing apparatus 10. FIG. 32 illustrates an example in which a message asking whether to select the transmission rule for company A is displayed on the input screen 261.

Figure 33:
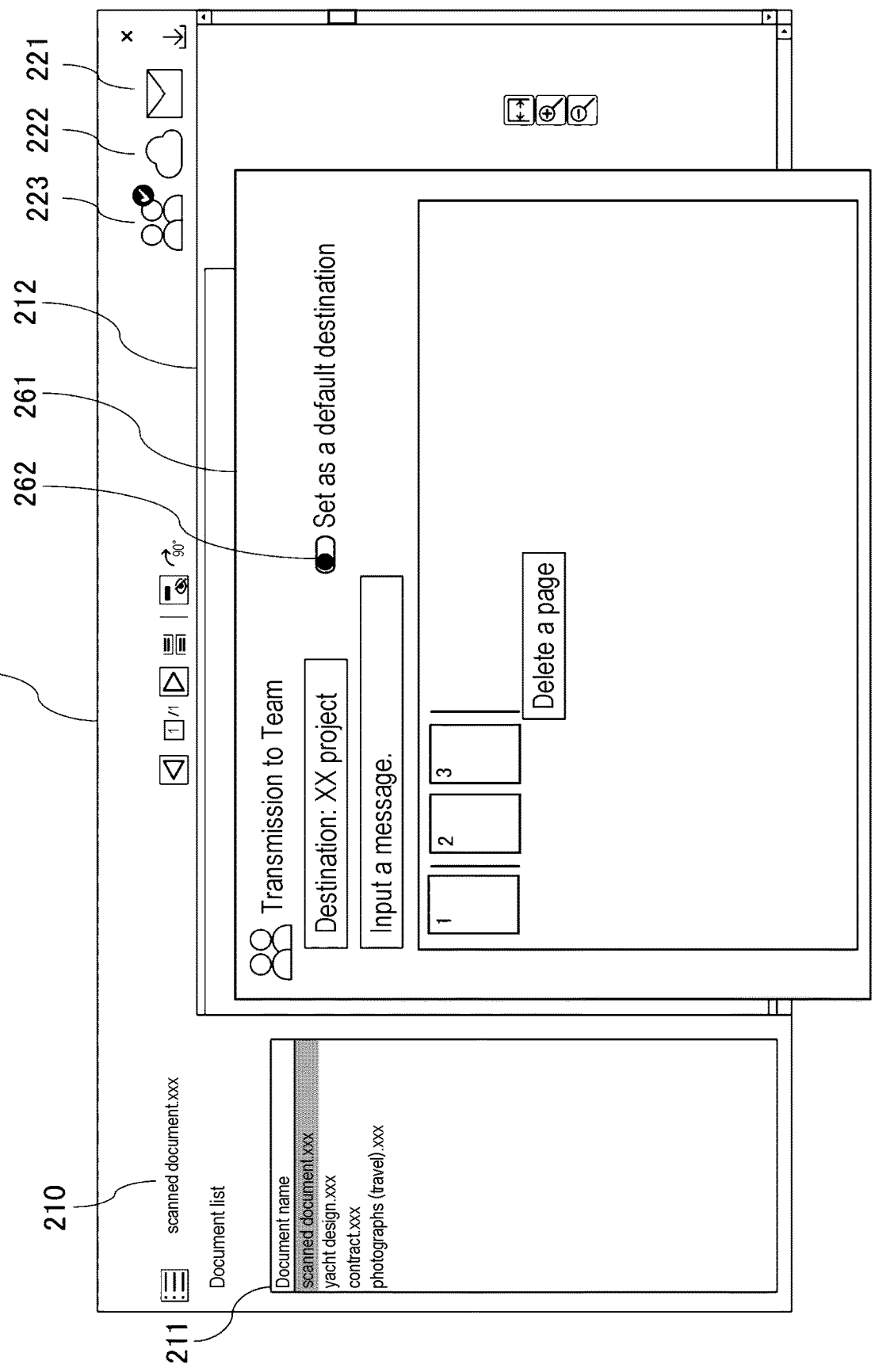
FIG. 33 is a diagram illustrating an example of the user interface displayed by the information processing apparatus.

The document management application may enable document data to be edited on the input screen 261. FIG. 33 is a diagram illustrating an example of the user interface displayed by the information processing apparatus 10. FIG. 33 illustrates an example in which a preview screen showing a list of pages of document data is displayed on the input screen 261. The document management application may provide a function of allowing the user to delete the document data in units of pages on the input screen 261.

Figure 34:
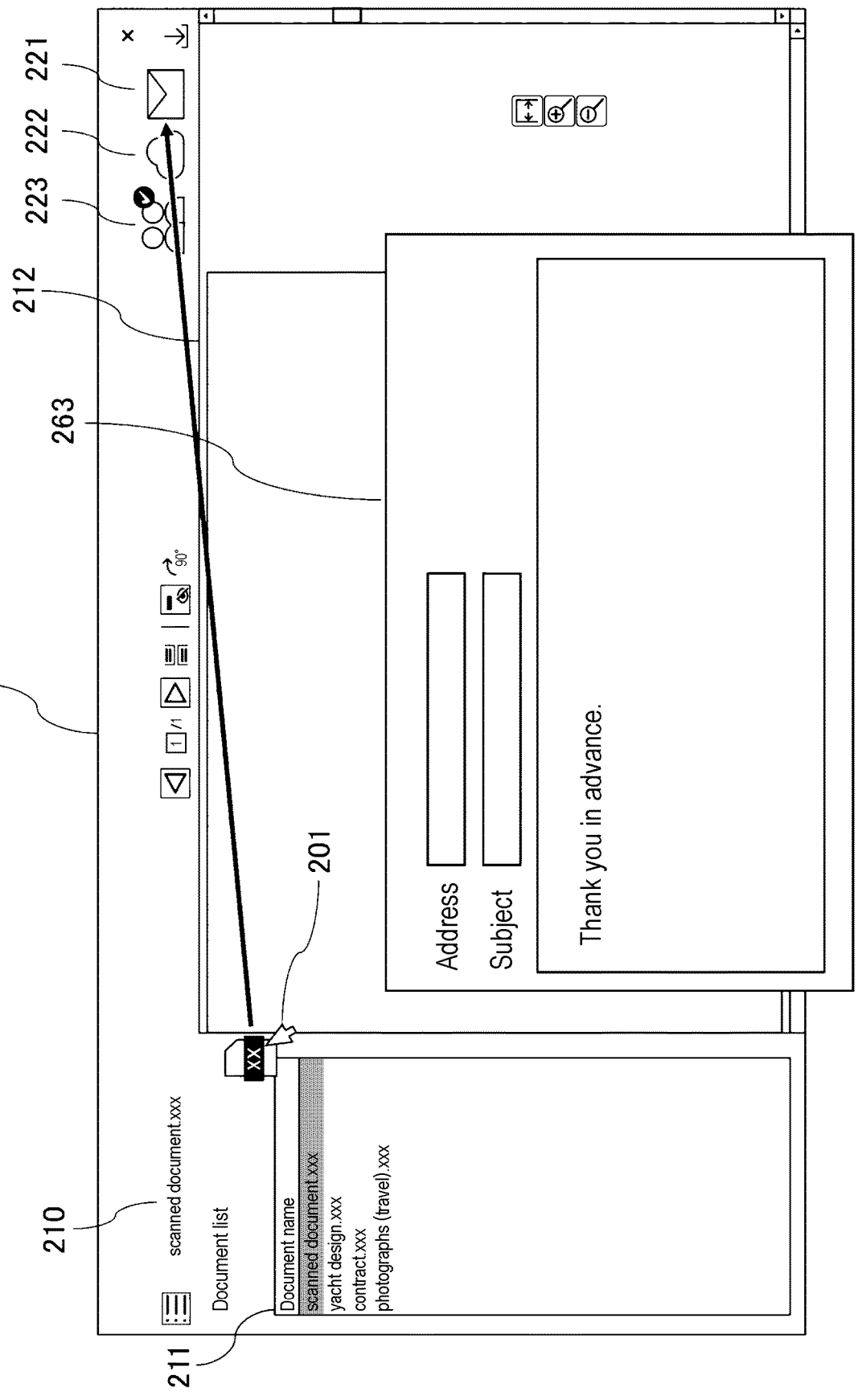
FIG. 34 is a diagram illustrating an example of the user interface displayed by the information processing apparatus.

The document management application may automatically display a mail input screen of email software in response to document data being dragged to and dropped on the icon 221. FIG. 34 is a diagram illustrating an example of the user interface displayed by the information processing apparatus 10. FIG. 34 illustrates an example in which a mail input screen 263 of email software is displayed in response to document data being dragged to and dropped on the icon 221.

As described above, the document management application according to the present exemplary embodiment has a function of transmitting document data to a destination user and a function of proposing a transmission method to be used to transmit the document data to the destination user.

Next, the operation of the information processing apparatus 10 will be described.

Figure 35:
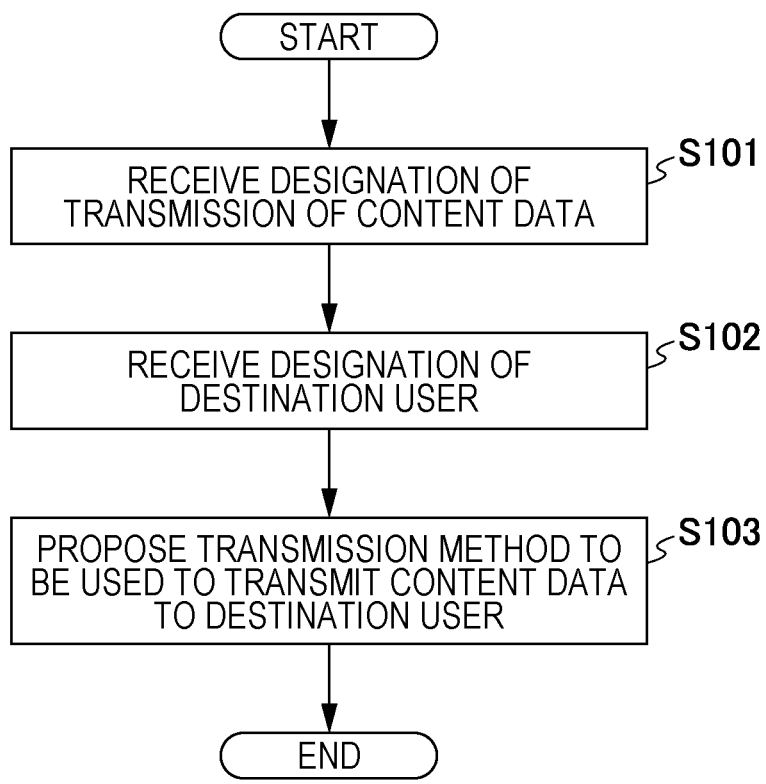
FIG. 35 is a flowchart illustrating a flow of information processing performed by the information processing apparatus.

FIG. 35 is a flowchart illustrating a flow of information processing performed by the information processing apparatus 10. The CPU 11 reads out the information processing program from the ROM 12 or the storage 14, loads the program into the RAM 13, and executes the program, thereby performing information processing of proposing a transmission method suitable for a destination user of content data. The flowchart in FIG. 35 illustrates a flow of information processing in a state in which the CPU 11 is executing the document management application.

First, in step S101, the CPU 11 receives designation of transmission of content data from a user.

Subsequently to step S101, in step S102, the CPU 11 receives designation of a destination user of the content data from the user.

Subsequently to step S102, in step S103, the CPU 11 proposes a transmission method to be used to transmit the content data to the designated user. For example, the CPU 11 proposes a transmission method that is most frequently used by the destination user as a transmission method suitable for the destination user, as described above. Alternatively, for example, the CPU 11 proposes a transmission method that is designated in advance by the destination user as a transmission method suitable for the destination user, as described above.

As a result of executing the foregoing processing, the information processing apparatus 10 according to the present exemplary embodiment is capable of proposing a transmission method suitable for a destination user at the time of transmitting document data to the destination user. The user of the information processing apparatus 10 receives the proposal of a transmission method from the information processing apparatus 10, thereby being able to select a transmission method more easily than in a case where there are no guidelines for selecting a transmission method.

The information processing executed by the CPU by reading software (program) in the above exemplary embodiment may be executed by various processors other than the CPU. In this case, examples of the processors include a programmable logic device (PLD) whose circuit configuration is changeable after manufacturing, such as a field-programmable gate array (FPGA), and a dedicated electric circuit, which is a processor having a circuit configuration exclusively designed to execute specific processing, such as an application specific integrated circuit (ASIC). The information processing may be executed by one of these various processors, or may be executed by a combination of two or more of these various processors of the same type or different types (for example, a combination of plural FPGAs, a combination of a CPU and an FPGA, or the like). The hardware structure of these various processors is more specifically an electric circuit including a combination of circuit elements such as semiconductor elements.

In the above exemplary embodiment, a description has been given that the information processing program is stored (installed) in the ROM or storage in advance, but the present disclosure is not limited thereto. The program may be provided in the form of being recorded on a non-transitory recording medium, such as a compact disc read only memory (CD-ROM), a digital versatile disc read only memory (DVD-ROM), or a universal serial bus (USB) memory. Alternatively, the program may be downloaded from an external apparatus via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
propose, in response to receipt of designation of a user as a destination of content data at a time of transmitting the content data, at least one transmission method to be used to transmit the content data to the user among a plurality of transmission methods, wherein
the processor is configured to propose, based on a comparison of information regarding the numbers of times of use of the individual transmission methods by the user, the at least one transmission method to be used to transmit the content data to the user among the plurality of transmission methods.

2. The information processing apparatus according to claim 1, wherein the processor is configured to propose, based on the information regarding the numbers of times of use, the at least one transmission method to be used to transmit the content data to the user, the information being information regarding the numbers of operations performed by the user for individual types of operations in the individual transmission methods.

3. The information processing apparatus according to claim 2, wherein the processor is configured to propose, based on information regarding at least the numbers of times of startup, the numbers of times of transmission, or the numbers of times of reception in the individual transmission methods, the at least one transmission method to be used to transmit the content data to the user.

4. The information processing apparatus according to claim 3, wherein the processor is configured to propose the at least one transmission method to be used to transmit the content data to the user, with the numbers of times of startup, the numbers of times of transmission, and the numbers of times of reception in the individual transmission methods having predetermined weights.

5. The information processing apparatus according to claim 1, wherein the processor is configured to, in a case where a transmission method to be used for the user has been registered and where the registered transmission method is different from a transmission method to be proposed for the user when the user is designated, propose the transmission method different from the registered transmission method.

6. The information processing apparatus according to claim 1, wherein the processor is configured to propose, based on information regarding the numbers of times of use of the individual transmission methods between the user and another user, the at least one transmission method to be used to transmit the content data to the user among the plurality of transmission methods.

7. The information processing apparatus according to claim 6, wherein the processor is configured to propose, based on information regarding the numbers of times of use of the individual transmission methods for transmitting content data from the other user to the user, the at least one transmission method to be used to transmit the content data to the user among the plurality of transmission methods.

8. The information processing apparatus according to claim 1, wherein the processor is configured to propose, as the transmission method to be used to transmit the content data to the user, a transmission method designated by the user among the plurality of transmission methods.

9. The information processing apparatus according to claim 1, wherein the processor is configured to propose, based on information regarding an attribute of the user, the at least one transmission method to be used to transmit the content data to the user among the plurality of transmission methods.

10. The information processing apparatus according to claim 1, wherein the processor is configured to propose, in accordance with contents of the content data, the transmission method to be used to transmit the content data to the user among the plurality of transmission methods.

11. The information processing apparatus according to claim 1, wherein the processor is configured to propose, in a case where the content data is specific data, a corresponding specific transmission method as the transmission method to be used to transmit the content data to the user.

12. A non-transitory computer readable medium storing a computer program causing a computer to execute a process, the process comprising:
proposing, in response to receipt of designation of a user as a destination of content data at a time of transmitting the content data, at least one transmission method to be used to transmit the content data to the user among a plurality of transmission methods, wherein
the process includes proposing, based on a comparison of information regarding the numbers of times of use of the individual transmission methods by the user, the at least one transmission method to be used to transmit the content data to the user among the plurality of transmission methods.

13. An information processing method comprising:
proposing, in response to receipt of designation of a user as a destination of content data at a time of transmitting the content data, at least one transmission method to be used to transmit the content data to the user among a plurality of transmission methods, wherein
the method includes proposing, based on a comparison of information regarding the numbers of times of use of the individual transmission methods by the user, the at least one transmission method to be used to transmit the content data to the user among the plurality of transmission methods.

\* \* \* \* \*